United States Patent [19]

Moir et al.

[11] Patent Number: 4,980,783

[45] Date of Patent: Dec. 25, 1990

[54] APPARATUS FOR AUTOMATICALLY APPLYING SERVO TRACK DATA TO A SELECTED SERVO SURFACE OF A HARD DISK WITHIN A HARD DISK ASSEMBLY

[75] Inventors: Michael B. Moir, Newbury Park; Richard G. Krum, Thousand Oaks, both of Calif.

[73] Assignee: Seagate Technology, Inc., Simi Valley, Calif.

[21] Appl. No.: 330,237

[22] Filed: Mar. 29, 1989

[51] Int. Cl.$^5$ ............................................. G11B 33/00
[52] U.S. Cl. ............................... 360/77.02; 360/98.01
[58] Field of Search ............... 360/77.02, 77.03, 77.08, 360/77.11, 98.01, 98.06, 137

[56] References Cited

U.S. PATENT DOCUMENTS

| | | | |
|---|---|---|---|
| 4,371,902 | 2/1983 | Baxter et al. | 360/77.03 X |
| 4,531,167 | 7/1985 | Berger | 360/77.02 |
| 4,669,007 | 5/1987 | Moon et al. | 360/77.08 X |
| 4,831,470 | 5/1989 | Brunnett et al. | 360/77.03 X |
| 4,920,442 | 4/1990 | Dimmick | 360/97.01 X |

OTHER PUBLICATIONS

An extract from Klinger Scientific Catalog 584C (pp. 1, 2, 8, 9, 44 and 47).
Catalog from Cambrian Systems, Inc.
Five sheets of technical drawings for WREN III STW.

Primary Examiner—Aristotelis M. Psitos
Assistant Examiner—David L. Robertson
Attorney, Agent, or Firm—Kelly, Bauersfeld & Lowry

[57] ABSTRACT

A station for writing servo track and clock information onto a hard disk drive assembly (HDA) automatically positions and accesses a pallet assembly, including the HDA, in accordance with computerized instructions. A Winchester-type HDA is positioned on the pallet assembly, which in turn is positioned upon a carriage assembly. An automatic, computer-controlled sequence begins which draws the carriage assembly into the station, connects the HDA electronically with the station, and then causes a platten assembly to lift the pallet assembly (with the HDA) into engagement with a top plate assembly. The top plate assembly engages the HDA in a manner wherein the positioning of the HDA actuator assembly is accurately controlled relative to the hard disks located therein. After the hard disks are brought to operational speed utilizing a spindle motor built into the HDA, a clock head assembly positions a clock head to write clock data onto the upper surface of a selected hard disk. A positioner assembly, through an arm assembly, then precisely moves the HDA actuator assembly to erase a face of a hard disk, and then write servo data onto that face utilizing the read/write head of the HDA actuator assembly itself. After the servo data has been applied, the pallet assembly is lowered by the platten assembly, and then withdrawn by the carriage assembly for removal. To assist in disconnecting the HDA from the pallet assembly, ejectors are provided adjacent to a read/write flex connector and to a spindle motor connector on the pallet assembly.

77 Claims, 19 Drawing Sheets

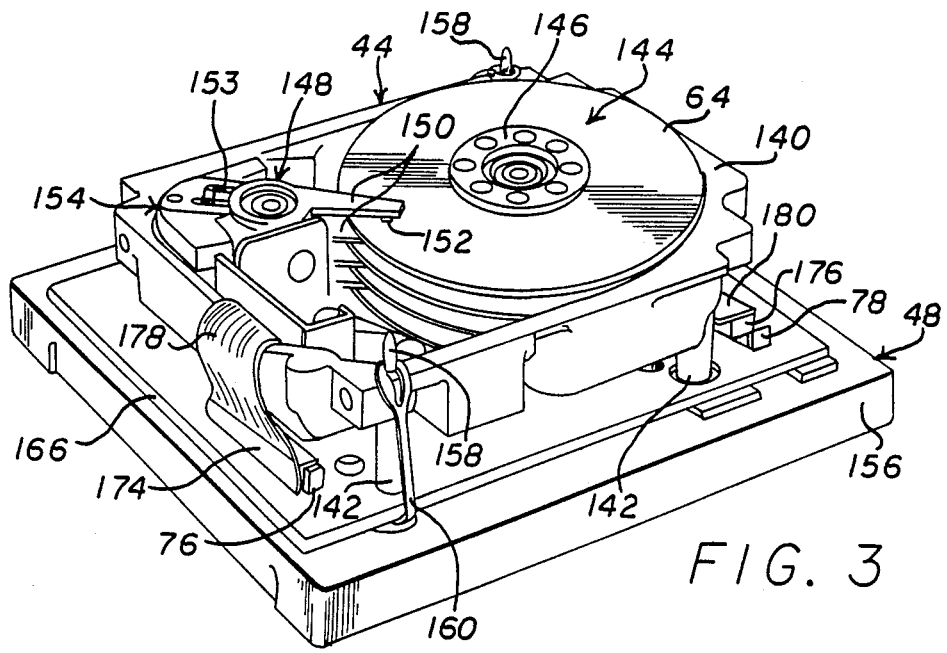
FIG. 3
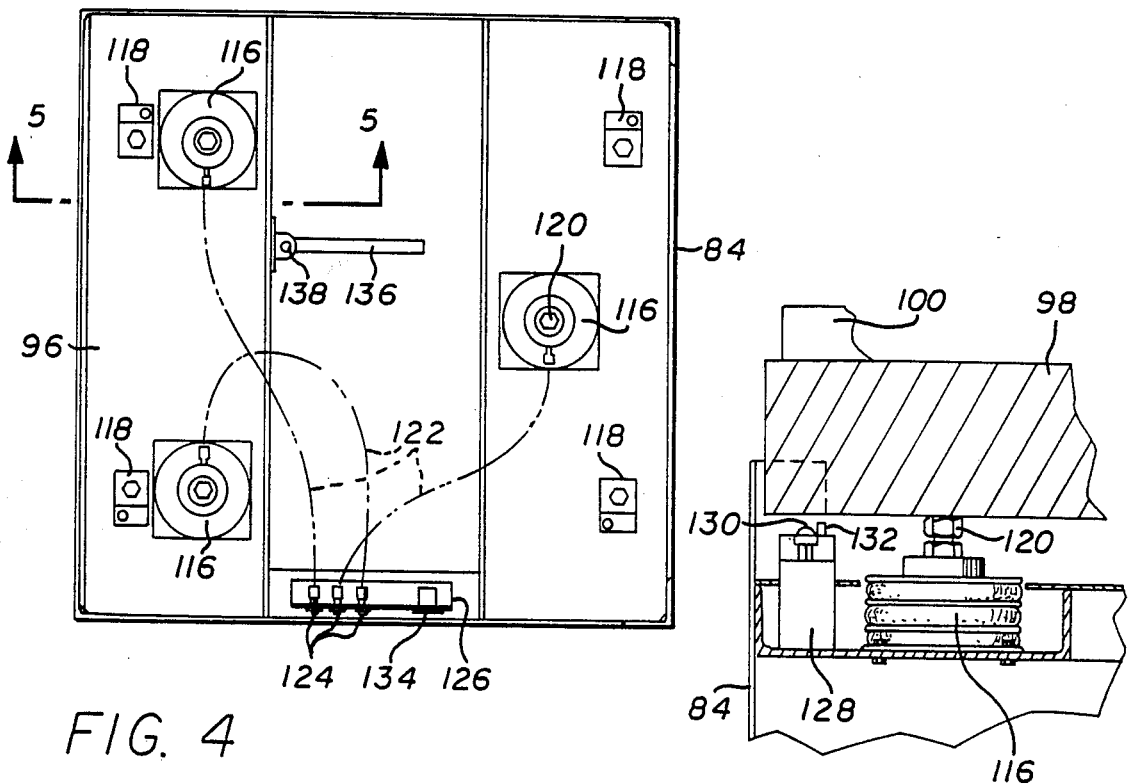
FIG. 4
FIG. 5

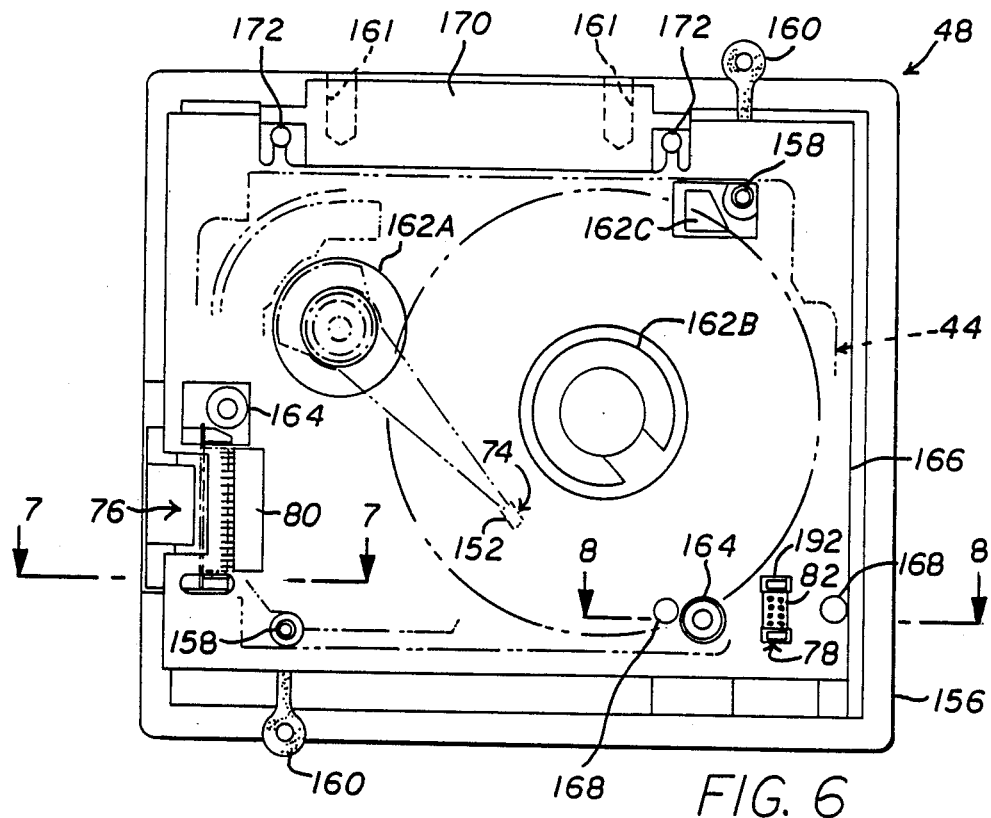
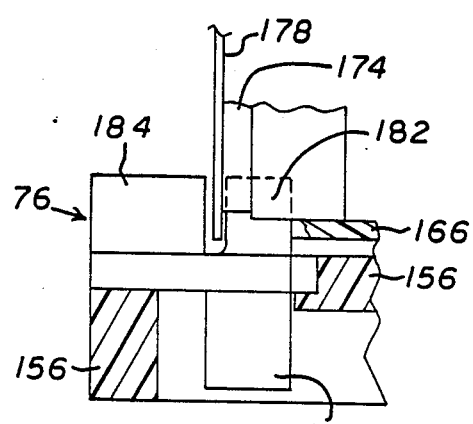
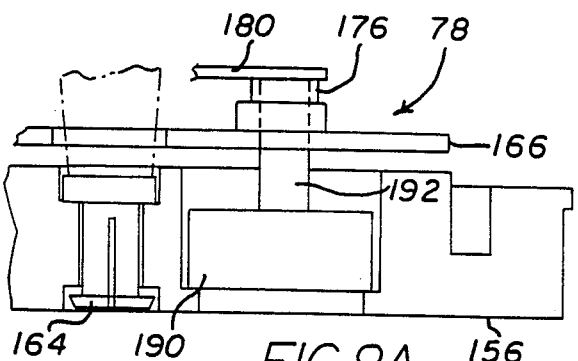
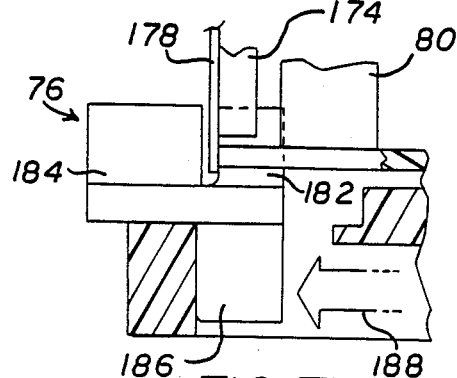
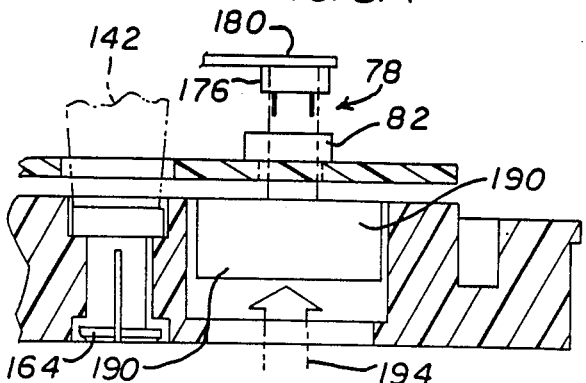

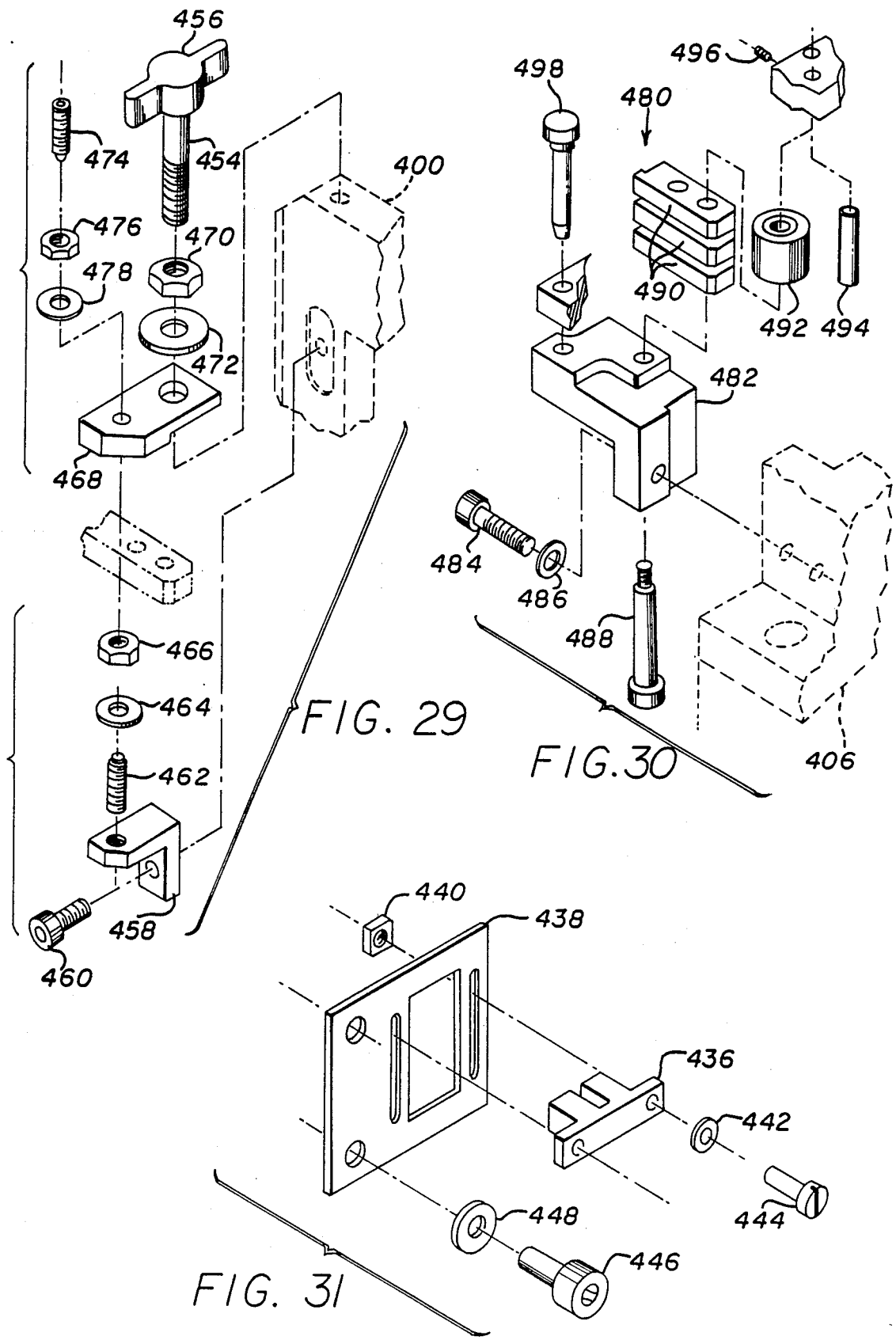

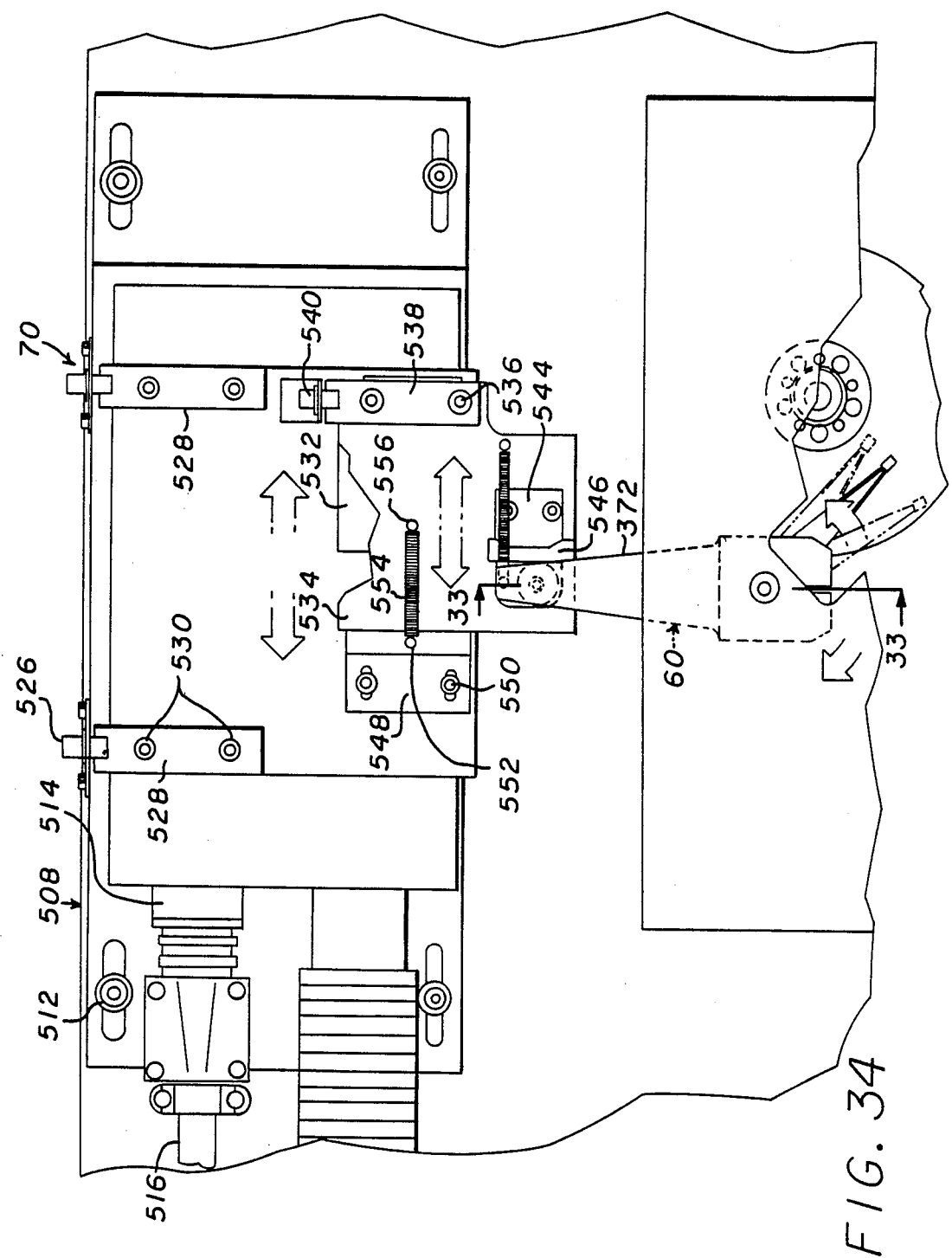

APPARATUS FOR AUTOMATICALLY APPLYING SERVO TRACK DATA TO A SELECTED SERVO SURFACE OF A HARD DISK WITHIN A HARD DISK ASSEMBLY

BACKGROUND OF THE INVENTION

This invention relates generally to hard disk drive assemblies for computers. More specifically, this invention relates to an automated servo track writer station which quickly and accurately places clock head and servo information on a hard disk drive assembly in accordance with computerized instructions.

In recent years, microcomputer equipment, particularly the so-called personal and desk top computers, have become extremely popular for a wide variety of business, educational and other uses. Such computers commonly include a main central processor unit having one or more memory storage disks for storage of data. In many modern computers the storage disk or disks sometimes referred to as "hard disks," are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable actuator are displaced by a limited rotation DC motor to traverse surfaces of the rotating disks for purposes of reading and writing data. Such Winchester-type disk drive units are generally preferred in comparison with so-called floppy-type disk drives due to their higher memory storage capacities and faster operating speeds.

The actuator used in Winchester-type disk drive units resembles the traversing arm of a common phonograph, and is pivotally mounted about a shaft adjacent to an edge of the stacked storage disks. Such actuators typically include an arm assembly designed to carry the electromagnetic heads which are used to read and write data on the disk stack, and a counterbalance situated opposite the arm assembly with respect to the pivot shaft.

A coil is mounted to the counterbalance portion of the actuator to interact with a magnet assembly, for purposes of controlling the movement and positioning of the electromagnetic heads. As a current moves through the coil, it reacts with the magnet assembly to move the entire actuator assembly, comprising the actuator and the coil.

For a typical Winchester-type disk drive, data is recorded onto magnetizable surfaces or surface films on the memory storage disks in the form of data bits adapted to be encoded and decoded in binary form. The data is recorded within the confines of narrow concentric tracks defined on the disk surfaces, with track densities in the range of 500 to 1000 and more tracks per inch being relatively well know. Accordingly, the total memory storage capacity for any selected disk drive unit is directly proportional to the number of available data tracks. When the disk drive unit includes multiple storage disks, the total number of available data tracks, and thus the total memory storage capacity, is increased.

In normal operation of a Winchester-type disk drive unit, a system controller is provided for identifying the location of data which has been recorded upon the storage disks, typically through the use of directory name, file name, and/or data address information. When reading of a specific data track is desired, the system controller signals a head actuator assembly to displace the heads to the desired position for accessing the data. Alternatively, when data recording or writing is desired, the system controller signals disk drive circuitry to command the actuator assembly to displace the heads in a manner aligning one head with a vacant data track. Importantly, for accurate track seeking and head alignment therewith, detectable servo and clock information is normally prerecorded onto one or more of the memory storage disks.

In accordance with one known servo seeking and tracking system, each surface of each disk includes servo information prerecorded within radially spaced servo segments or sectors. This type of servo system, commonly known as an "embedded" servo system, provides data which is read by the operating head for purposes of seeking and tracking within a designated data track. During head traverses to seek a new specified data track, the head responds to embedded track address information within the servo sectors to identify a specified destination track. While such embedded servo systems have functioned generally satisfactorily, such systems inherently include track seek or access speed limitations due primarily to the limited sample rate at which the head can read and respond to servo information within the servo sectors. This inherent seek speed limitation is rendered more significant when relatively high track densities are used. Moreover, an embedded servo system fixes the number of available data and servo sectors in a manner which is incompatible with some types of controller interfaces.

So-called "dedicated" servo surface systems are also generally known in the art, wherein servo seeking and tracking information is pre-recorded onto one surface of a memory storage disk in a disk drive unit having multiple disks. The servo seeking and tracking information is detected by an associated servo head for purposes of displacing and aligning a group of data heads with a designated data track, or to identify track crossing during a seek/access step. Such dedicated servo surface systems are preferred in certain multiple disk microcomputer applications since they can provide an overall increased data storage capacity to the disk drive unit.

In such dedicated servo surface systems, it has been a common practice to select the lower surface of a lowermost hard disk for the application of servo data. Thus, in utilizing prior servo track writer stations this lowermost servo surface is exposed, and the hard disk assembly is inverted prior to being manually inserted into the servo track writer apparatus. Further, in prior servo track writer devices, a read/write head provided by the device is utilized to write the servo data on the dedicated servo surface, rather than the adjacent head provided by the hard disk drive assembly. It has been found, however, that errors and defects can arise in hard disk drive assemblies due to manual handling of the hard drive assembly, particularly as it is inverted and then inserted within the servo track writer. Errors may also arise when the read/write heads provided in the hard disk drive assembly do not track the data precisely as written by the independent head utilized by the servo track writer.

Accordingly, there has been a need for a novel servo track writer station which is capable of writing servo track and clock information onto a hard disk drive assembly in accordance with computerized instructions and in a manner which closely parallels actual operating parameters. Thus, an automated servo track writer station is needed which accepts the hard disk assembly and in its normal orientation, and which is capable of writing the servo data on the lowermost disk without inverting the unit. Additionally, a station is needed which minimizes manual handling of the hard disk assembly, particularly in so far as positioning of the hard disk assembly is concerned relative to operational placement within the writer station, and which isolates the hard drive assembly from vibration as the servo data is applied. Moreover, there exists a need for a servo track writer station which utilizes an actuator arm built into the hard disk assembly for purposes of writing servo data onto the dedicated disk surface, rather than a separate data arm for that purpose. The present invention fulfills these needs and provides other related advantages.

SUMMARY OF THE INVENTION

The present invention resides in an improved servo track writer station which automatically positions and accesses a hard disk assembly (HDA) in accordance with computerized instructions, for the application of servo track and clock information.

The servo track writer station generally comprises a housing, means for automatically positioning the HDA within the housing, means for rotating a hard disk within the HDA when positioned within the housing, and means for applying servo track data to a selected surface of the hard disk when the HDA is positioned within the housing. The servo track data is applied utilizing a read/write head provided by the HDA itself, which is adjacent to the selected surface. In applying the servo track data to the selected servo surface, the HDA is suspended within the housing to minimize vibration thereto. The HDA is then activated to bring the hard disk to an operational speed, and servo track data is supplied by the servo track writer station to the read/write head within the HDA. The servo track writer station then precisely controls positioning of the read/write head as it applies the servo track data to the selected servo surface.

In accordance with a preferred embodiment of the invention, a cabinet assembly is provided for supporting the various electronic components of the servo track writer station. Positioned atop the cabinet assembly is a granite assembly and means for ensuring that a working surface for the servo track writer station is dead-level. A pallet assembly includes alignment means for positioning the HDA on a pallet, means for securing the HDA to the pallet, an STW (Servo Track Writer) connector for connecting the pallet assembly with power and servo data from the servo track writer station, and means for connecting electrical components of the HDA with the servo track writer station through the STW connector. After the HDA is strapped onto the pallet assembly, a read/write flex connector is pressed into a plug on the pallet assembly with the assistance of an adjacent ejector. Similarly, a spindle motor connector is pressed into a spindle flex plug provided on the pallet assembly. These plugs conductively communicate with the STW connector.

In use, the operator places the HDA onto the pallet assembly and straps it securely into place. This new assembly comprising the pallet assembly and the HDA is then loaded onto a carriage assembly situated on top of the level granite assembly. An optical sensor signals to the servo track writer station that the carriage assembly is loaded, and causes activation of a lead screw assembly which pulls the carriage assembly, with the pallet assembly and HDA, into the housing.

Completion of travel of the carriage assembly into the housing is monitored by an optical sensor. Movement of the pallet assembly fully into the housing automatically connects the STW connector of the pallet assembly with an STW connector plug provided within the housing. This effectively forms an electronic connection between the HDA and the components situated therein, and the servo track writer station.

A camshaft assembly is then activated to rotate through one 180° turn, which lifts a platten assembly into engagement with the underside of the pallet assembly. The platten assembly includes five spring-loaded plungers which are positioned to engage the underside of the pallet assembly at predetermined locations. By elevating the pallet assembly, the HDA is lifted into engagement with a top plate assembly. The top plate assembly includes three downwardly extending spring-loaded plungers, a spindle shaft assembly, and an arm assembly. These components of the top plate assembly engage the HDA opposite the location of the spring-loaded plungers of the platten assembly, in a manner which tends to isolate the HDA from vibration.

With the HDA in this elevated position, the servo track writer station then activates a clock head assembly, which lowers a sliding arm to place a clock head into engagement with an upper surface of a selected disk. The clock head is capable of seeking a desired and predetermined upper surface of a selected disk, and applying clock data thereto. A disk pack assembly within the HDA housing then begins to rotate and accelerates to normal operating speed, and the clock data is applied to the selected disk and tested by the servo track writer station. The clock head is then withdrawn and a positioner assembly is activated.

The arm assembly forming a portion of the top plate assembly connects the positioner assembly to the HDA. The positioner assembly operates to precisely control the movement of the HDA actuator mechanism, which mechanism positions a read/write head which is adjacent to the selected servo surface. Typically the selected servo surface will be the lower surface of the lowermost hard disk in a disk stack. The positioner assembly controls movement of the actuator assembly so that the servo data can be applied utilizing the read/write head provided with the HDA, and not a separate read/write head provided by the servo track writer station.

The arm assembly includes a crash stop pin drive assembly which bears directly against a crash stop pin of the HDA actuator assembly. The HDA actuator assembly is controlled by the servo track writer station to the extent that the crash stop pin constantly bears against a square pin of the crash stop pin drive assembly. A Klinger unit forms a portion of the positioner assembly and precisely positions a shaft follower attached to the arm assembly which in turn moves the square pin of the crash stop pin drive assembly. This precise movement is coordinated with servo data being fed by the servo track writer station to the read/write head for application onto the selected servo surface.

After the clock and servo data have been applied to the hard disks, the servo track writer station automatically lowers the HDA and carries it out from the housing wherein it is easily removed by an operator. The HDA is then quickly and easily removed from the pallet assembly, for further processing if needed.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a perspective view of an HDA secure to an upper surface of the pallet assembly;

FIG. 4 is a sectional view of the servo track writer station taken generally along the line 4—4 of FIG. 1, illustrating generally a top plan view of a cabinet assembly, and more particularly an apparatus for leveling a granite assembly;

FIG. 5 is an enlarged fragmented sectional view taken generally along the line 5—5 of FIG. 4, illustrating the configuration of a leveling bellows and an out-of-level micro switch beneath a granite block;

FIG. 6 is a top plan view of the pallet assembly illustrated in FIG. 2, further showing the location, in phantom, of an HDA positioned atop the pallet assembly;

FIG. 7A is an enlarged fragmented sectional view taken generally along the line 7—7 of FIG. 6, illustrating the configuration of an ejector between a read/write flex connector and a read/write flex plug;

FIG. 7B is a fragmented sectional view similar to FIG. 7A and also taken generally along the line 7—7 of FIG. 6, illustrating the manner in which the ejector disconnects the read/write flex connector from the plug;

FIG. 8A is an enlarged fragmented sectional view taken generally along the line 8—8 of FIG. 6, illustrating the configuration of an ejector between a spindle flex connector and a spindle plug;

FIG. 8B is a fragmented sectional view similar to FIG. 8A and also taken generally along the line 8—8 of FIG. 6, further illustrating the manner in which the spindle ejector disconnects the spindle flex connector from the spindle plug;

FIG. 29 is an exploded perspective view of a portion of the clock head assembly, taken generally in the direction of arrow 29 in FIG. 26;

FIG. 30 is an exploded perspective view of components comprising a manual stop for the clock head assembly, taken generally in the direction of arrow 30 in FIG. 23;

FIG. 31 is an exploded perspective view taken generally in the direction of arrow 31 in FIG. 23, illustrating the components of an optical sensor affiliated with the clock head assembly;

FIG. 34 is an enlarged plan view taken generally along the line 34—34 of FIG. 32.

DETAILED DESCRIPTION OF THE PREFERRED EMBODIMENT

Figure 1:
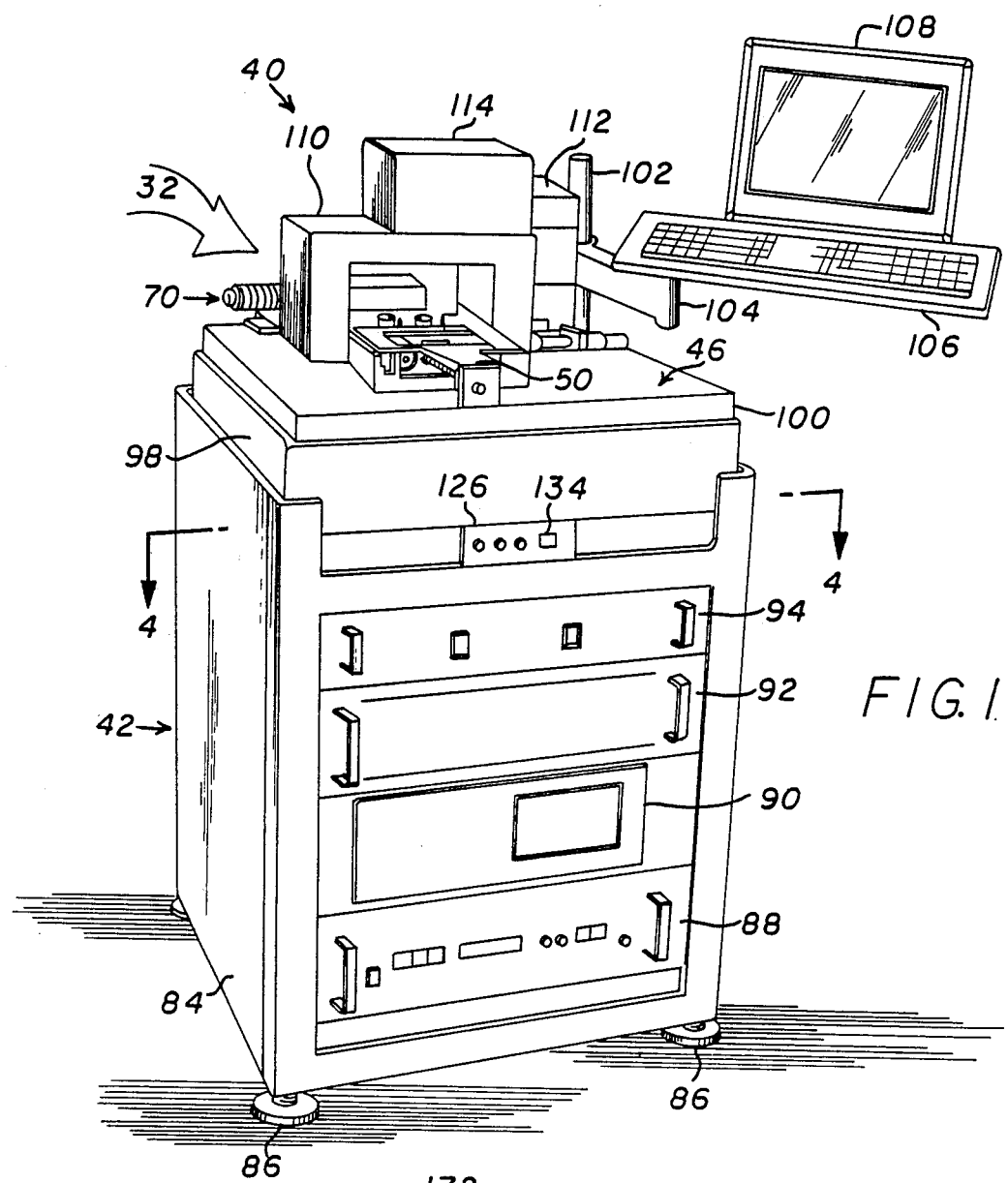
FIG. 1 is a perspective view of a servo track writer station embodying the invention.

As shown in the drawings for purposes of illustration, the present invention is concerned with an improved servo track writer station, generally designated in FIG. 1 by the reference number 40. This improved servo track writer station 40 comprises, generally, a cabinet assembly 42 in which the bulk of the electronic controllers for writing servo data onto a hard disk drive assembly (HDA) 44, are positioned. The cabinet assembly 42 also provides a base for a granite assembly 46, which provides a dead-level platform for the automated handling of the HDA 44 and for the writing of servo data thereon.

Figure 2:
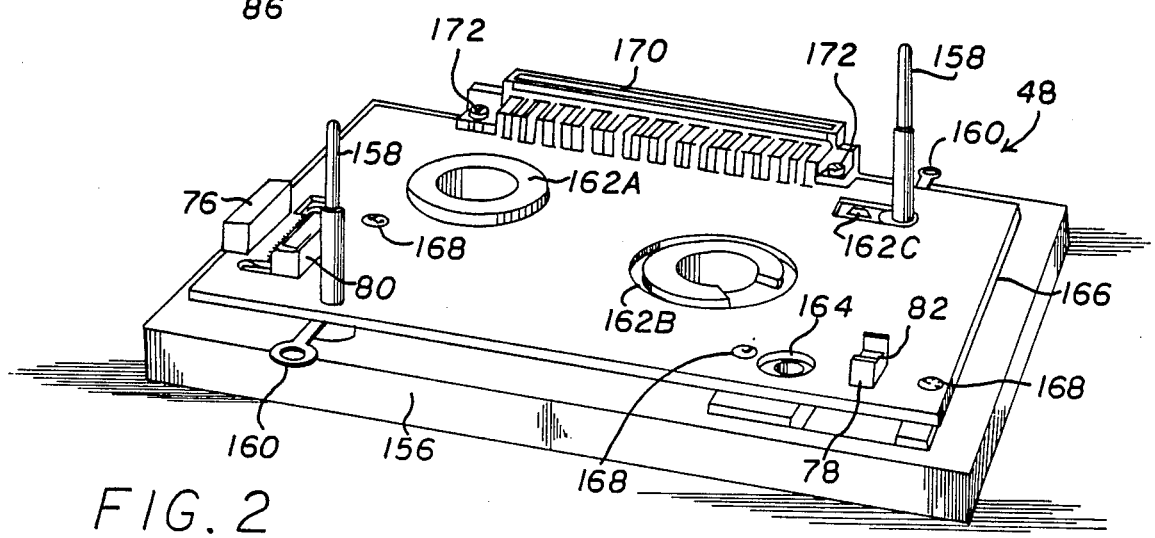
FIG. 2 is a top perspective view of a pallet assembly onto which a hard disk drive assembly (HDA) is placed prior to use in..connection with the servo track writer station.
Figure 14:
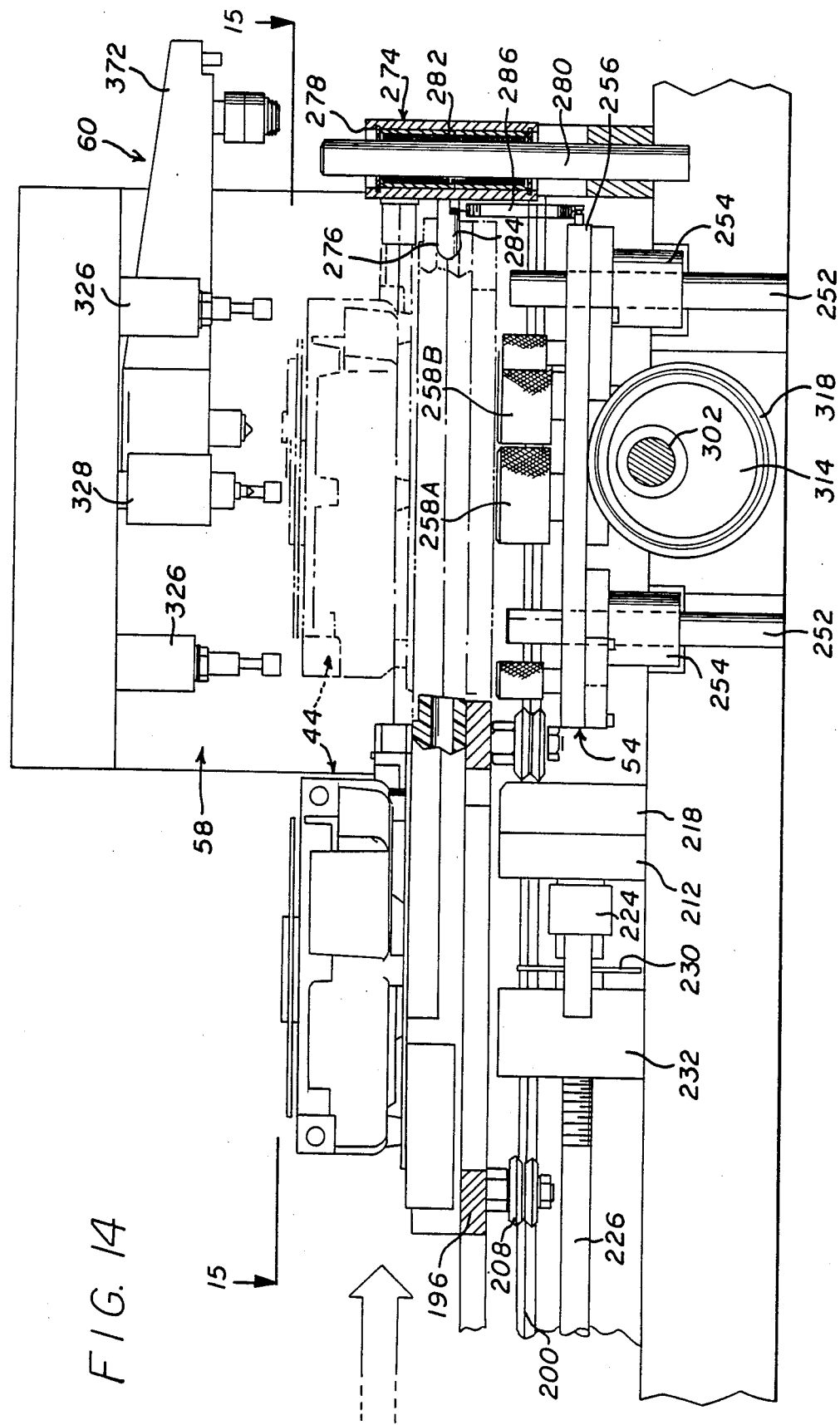
FIG. 14 is a vertical sectional view taken generally along the line 14—14 of FIG. 13, illustrating, generally, the manner in which the carriage assembly moves the pallet assembly and the HDA within the servo track writer station.

In a preferred form of the invention, a pallet assembly 48 (FIGS. 2 and 3) is provided for securely positioning the HDA 44 thereon in a known configuration. The pallet assembly 48, together with the HDA 44, is then positioned on a carriage assembly 50 which transports the pallet assembly 48 and the HDA 44 within the servo track writer station for processing. An automatic, computer-controlled sequence begins with the proper positioning of the pallet assembly 48 upon the carriage assembly 50, through activation of a lead screw assembly 52 which moves the carriage assembly to position the pallet assembly directly over a platten assembly 54 (FIG. 14). When drawn over the platten assembly 54, the pallet assembly 48 further electronically connects the HDA 44 to the servo track writer station 40.

Figure 17:
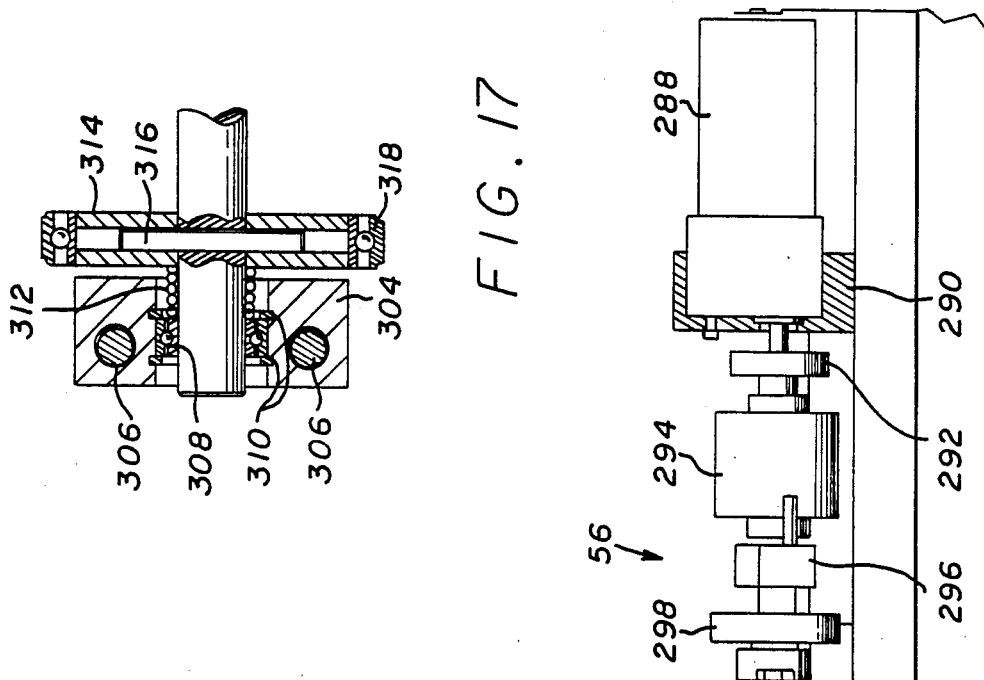
FIG. 17 is an enlarged sectional view taken generally along the line 17—17 of FIG. 16, illustrating the components of an elevator cam and an associated support.
Figure 18:
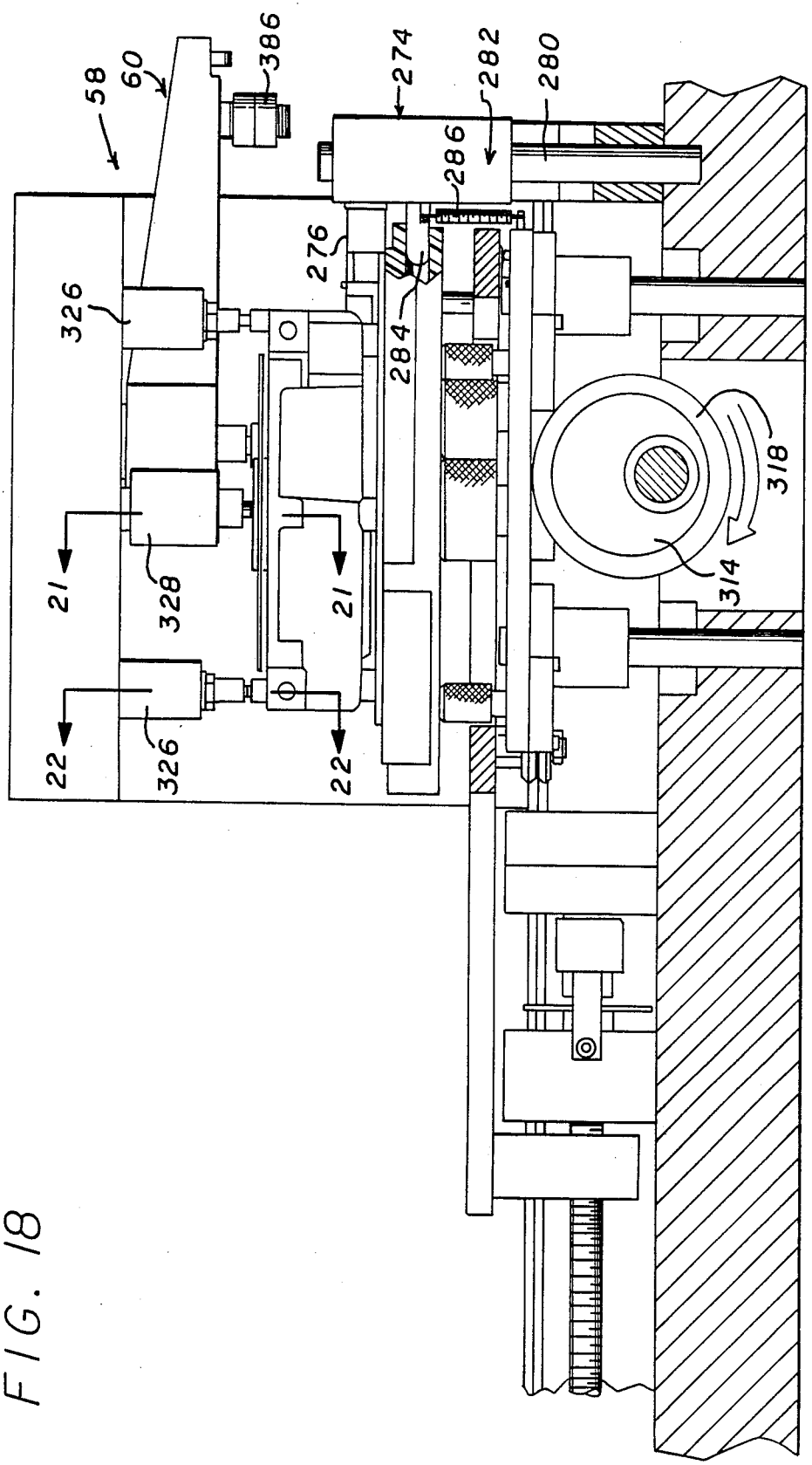
FIG. 18 is a vertical sectional view similar to FIG. 14 and likewise taken generally along the line 14—14 of FIG. 13, illustrating the manner in which the camshaft assembly elevates the platten assembly.
Figure 33:
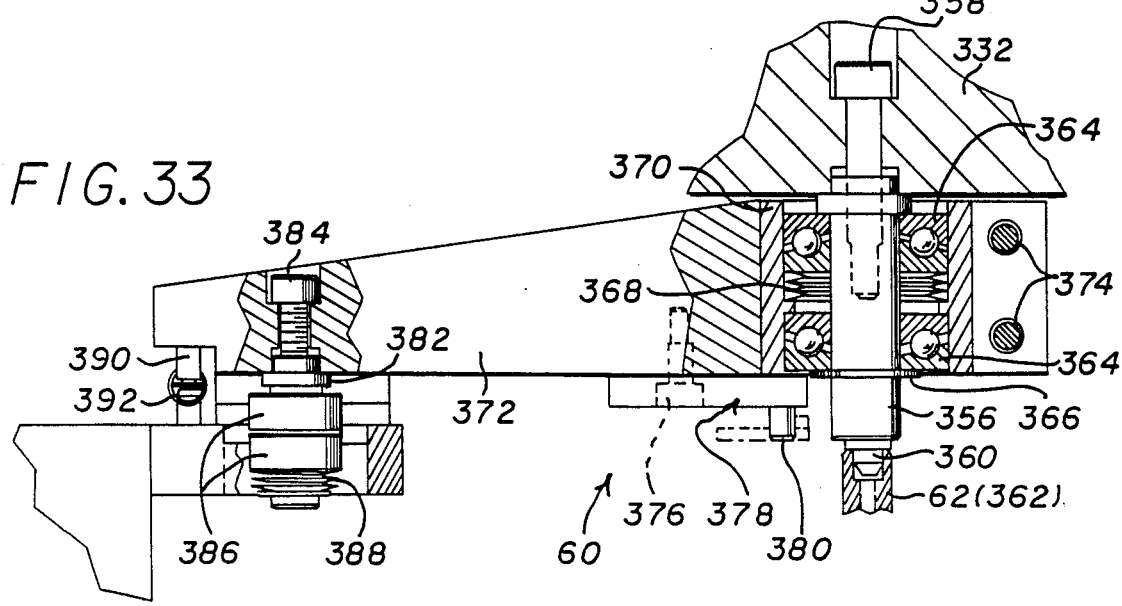
FIG. 33 is an enlarged, fragmented, partially sectional view of the actuator arm assembly, taken generally along the line 33—33 of FIG. 12, illustrating engagement between the actuator arm assembly and the positioner assembly at one end, and the actuator arm assembly and the HDA at the other.

A camshaft assembly 56 (FIGS. 16 and 17) is activated to elevate the pallet assembly 48 and place the HDA 44 into engagement with a top plate assembly 58 (FIG. 18). A top plate assembly 58 engages the HDA 44 so as to place an arm assembly 60 (FIG. 33) into direct contact with a actuator shaft 62 of the HDA 44.

Figure 32:
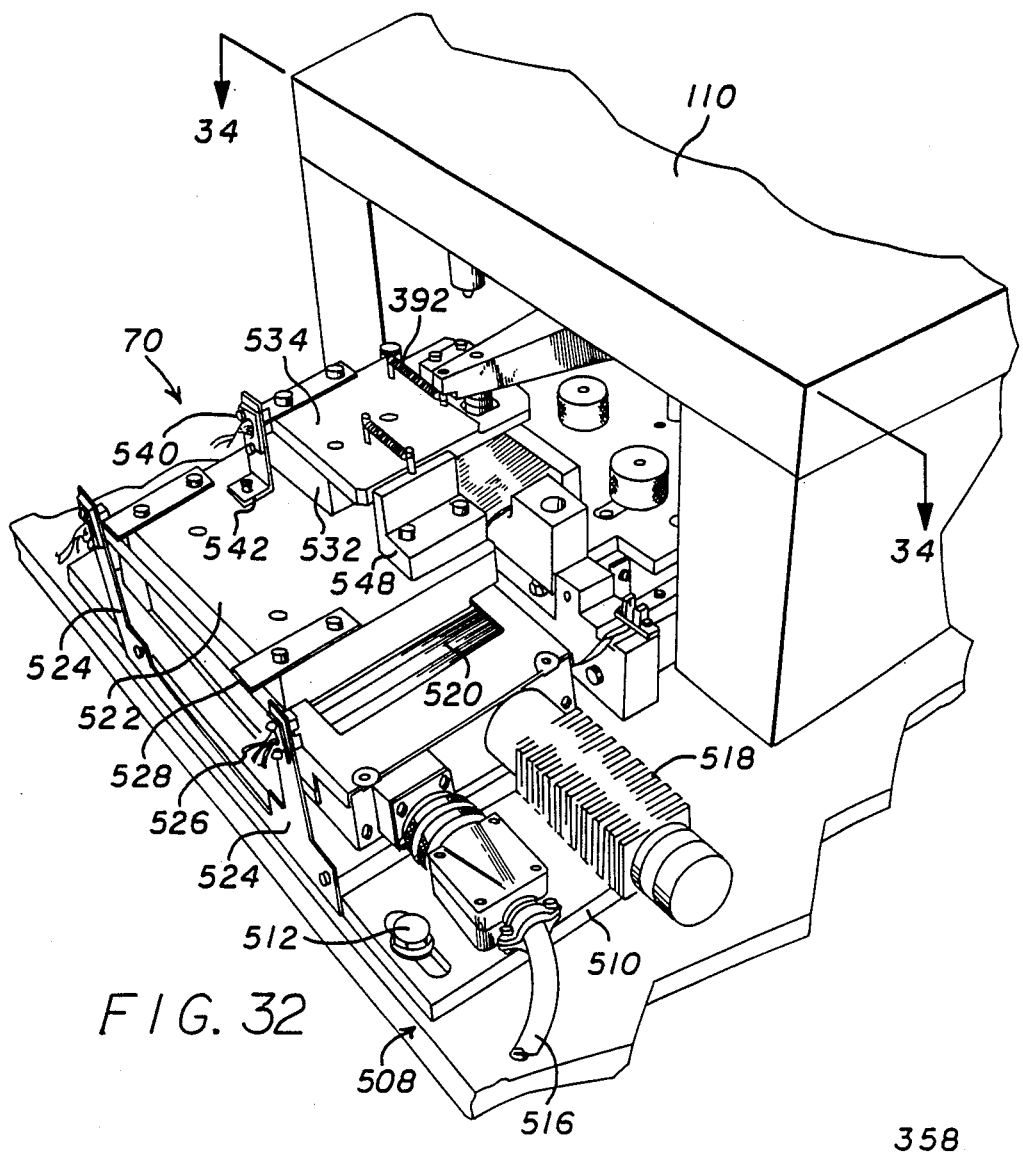
FIG. 32 is an enlarged fragmented rear perspective view of an upper portion of the servo track writer station and taken generally in the direction of arrow 32 in FIG. 1, illustrating a positioner assembly and components associated with a K-linger stepper motor which are utilized to control the precise movement of one end of an actuator arm assembly.

The hard disks 64 of the HDA 44 are then accelerated to operational speed utilizing a spindle motor built into the HDA, and a clock head assembly 66 positions a clock head 68 to write clock data onto the upper surface of a selected one of the hard disks 64 (see FIGS. 23 through 31). A positioner assembly 70 (FIGS. 32 through 34), through the arm assembly 60, then precisely moves the HDA actuator shaft 62 to erase a face of a hard disk, which is designated as the selected servo surface 72. Following this erasing step, the positioner assembly 70, in connection with the arm assembly 60, precisely moves the actuator shaft 62 as servo data is written onto the servo surface 72 with the read/write head 74 included within the HDA 44 and adjacent to the servo surface.

After the servo data is written onto the servo surface 72, the camshaft assembly 56 is activated to lower both the platten assembly 54 and the pallet assembly 48. Once lowered, the lead screw assembly 52 is activated to withdraw the carriage assembly 50 from within the servo track writer station 40. An operator can then remove the pallet assembly 48 with the attached HDA 44 from the carriage assembly 50, and place another pallet assembly 48 (carrying another HDA 44) onto the carriage assembly 50 to repeat the process. The HDA 44 with clock and servo data applied can then be quickly removed from the pallet assembly 48 and sealed. To assist in disconnecting the HDA 44 from the pallet assembly 48, ejectors 76 and 78 are provided on the pallet assembly adjacent to a read/write flex connector plug 80 and to a spindle motor connector plug 82 provided on the pallet assembly (FIGS. 6 through 8).

The improved servo track writer station 40 of the present invention is designed to specifically process the HDA 44 in its preferred upright configuration and minimize and/or eliminate inverting the HDA in order to apply servo track or clock data. With the exception of the step of attaching the HDA 44 to the pallet assembly 48, manual handling of the HDA in connection with the application of servo data to the servo surface 72 is minimized. Further, rather than utilizing a separate read/write head provided by the writer station, the present invention utilizes a read/write head 74 attached to the HDA actuator shaft 62 to both erase the servo surface 72 and write servo data thereon.

In accordance with the present invention, and with reference to FIG. 1, the cabinet assembly 42 includes a cabinet frame 84 which is supported above a generally horizontal surface by adjustable leveling pads 86. A front face of the cabinet frame 84 is open to receive various electronic components of the servo track writer station 40. In particular, typically positioned within the cabinet frame 84 is a Klinger positioner electronics unit 88, a computer tray assembly 90, a card cage assembly 92, and a power supply tray assembly 94.

The granite assembly 46 is positioned over an upper surface 96 of the cabinet assembly 42, and includes a granite block 98 which supports an overlying aluminum plate 100. Attached to the aluminum plate 100 are various components of the servo track writer station 40 which physically interact with the HDA 44. Additionally, a monitor stand 102 is supported within the aluminum plate 100, and carries a support arm 104 which, in turn, adjustably positions a keyboard 106 and a monitor 108. The keyboard 106 and the monitor 108 are utilized by an operator to program the various electronic components of the servo track writer station 40, and permit adjustments in function and operation. Also attached to the aluminum plate 100 are the positioner assembly 70, a housing 110 for the top plate assembly 58, a card cage assembly 112, and a cover 114 for the clock head assembly 66.

With reference to FIGS. 4 and 5, positioned on top of the upper surface 96 of the cabinet assembly 42 are three adjustable pneumatic leveling bellows 116, and four low air emergency stop assemblies 118. The leveling bellows 116 are positioned atop the upper surface 96 to form a tripod-like support for the granite block 98. The leveling bellows 116 each include a rest button 120 which engages the lower surface of the granite block 98. Each leveling bellows 116 is connected via tubing (schematically illustrated as the lines 122), to valve connectors 124 mounted upon an air valve bracket 126. The bracket 126 is attached to a front edge of the upper surface 96 of the cabinet assembly 42.

Each low air emergency stop assembly 118 includes a support block 128 fixed to the upper surface of the cabinet assembly 42, a rigid stop button 130 which extends above the block 128, and a micro switch 132 which extends a short distance above the top of the stop button 130. The micro switches 132 are tied into a level lamp 134 which is visible from the front of the cabinet assembly 42 and which is supported by the air valve bracket 126. The level lamp 134 illuminates only when none of the four micro switches 132 is depressed by the granite block 98. This provides a visual indication for the user that the granite block 98 is supported entirely by the leveling bellows 116, which preferably have been preadjusted to hold the granite block dead-level. If one of the bellows 116 malfunctions, a portion of the granite block 98 will engage at least one of the micro switches 132, and cause the level lamp 134 to go out. The stop buttons 130 are provided to protect the micro switches 132 from damage, by supporting the weight of the granite block after the associated switch 132 has been partially depressed.

A cable carrier 136 is attached to the upper surface 96 of the cabinet assembly 42 to facilitate movement of cables extending between the servo track writer station's primary electronic components 88 through 94, as those components are placed into and withdrawn from the cabinet assembly. The cable carrier 136 pivots upon a hinge 138.

With reference to FIGS. 2, 3 and 6-8, before the HDA 44 is placed within the servo track writer station, it must first be mounted upon the pallet assembly 48 in the manner shown in FIG. 3. Referring specifically to that figure, the HDA 44 contemplated herein is of standard construction, and includes an HDA housing 140 having three housing legs 142, into which a disk pack assembly 144 is placed. The disk pack assembly 144 comprises the hard disks 64 placed about a spindle and spindle motor (not shown) which are clamped into place by a clamp ring 146. Situated within the HDA housing 140 and adjacent to the disk pack assembly 144 is a pivotable actuator assembly 148 comprising a plurality of actuator arms 150 which carry one or more read/write heads 152. The actuator assembly 148 of the HDA 44 also includes a crash stop pin 153 which is utilized to limit pivotal movement of the actuator arms 150. A portion of the crash stop pin 153 extends upwardly from the uppermost actuator arm 150. Positioning of the actuator arms 150 with respect to the disk pack assembly 144 is controlled by means of a magnet housing assembly 154, in a well known manner. After the clock and servo information is placed on the appropriate hard disks 64, a cover (not shown) is placed over the exposed upper surface of the HDA housing 140 to create a sealed unit.

The pallet assembly 48 includes all of the means necessary to securely position the HDA 44 with respect to known reference points, and connect the HDA 44 to electronic circuitry of the servo track writer station 40. The pallet assembly 48 includes an injection molded pallet 156 which provides a base for supporting other components of the pallet assembly. A pair of HDA alignment pins 158 extend upwardly from the pallet 156 and are positioned to extend through passageways provided through the HDA housing 140 for proper HDA alignment. A strap 160 extends from a lower end of each alignment pin 158, and is looped over the upper end of its respective alignment pin when the HDA 44 is placed upon the pallet assembly 48 (see FIG. 3). The pallet 156 also includes a pair of vertical recesses (not shown) in the lower rear surface thereof, which facilitate positioning of pallet assembly onto the carriage assembly 50. Further, a pair of horizontal recesses 161 are provided in the rear edge of the pallet 156 to facilitate vertical movement of the pallet assembly 48.

Extending through the width of the pallet 156 are three precision engagement pads 162a-c, which contact specific locations on the underside of the HDA housing 140. In particular, the engagement pad 162a engages a portion of the HDA housing 140 immediately beneath the HDA actuator assembly 148. The engagement pad 162b engages a portion of the HDA housing 140 immediately below the disk pack assembly 144. The engagement pad 162c is situated beneath one of the housing legs 142. In addition to these engagement pads 162a-c, a pair of floating precision inserts 164 are provided immediately beneath the remaining two HDA housing legs 142, and are permitted slight movement with respect to the pallet 156 (see FIGS. 8A and 8B).

A printed circuit board 166 is fixed to the upper surface of the pallet 156 by a plurality of screws 168, and the circuit board includes appropriate openings to permit contact between the HDA housing 140, and the engagement pads 162 and the precision inserts 164. Fixed to the circuit board 166 is the read/write flex connector plug 80, the spindle flex connector plug 82 and an STW (Servo Track Writer) connector 170, all of which electronically communicate through the circuit board 166. For added reinforcement, the STW connector 170 is attached to the pallet 156 by screws 172.

The read/write flex plug 80 engages a connector 174 of a flex cable 178 from the HDA 44. Similarly, the spindle flex plug 82 engages a connector 176 which is attached to a flex cable 180 from the spindle motor within the HDA. The STW connector 170 engages a plug situated within the servo track writer station 40, to supply power and data input through the flex cables 178 and 180 to the HDA 44.

With reference to FIGS. 7 and 8, the ejectors 76 and 78 will now be described. The ejectors 76 and 78 comprise rigid elements positioned within the pallet 156 and which are slidable with respect thereto. The ejector 76 is positioned adjacent to the read/write flex plug 80 and is configured to include a portion 182 which fits between a portion of the read/write flex connector 174 and the plug 80. Another portion 184 of the ejector 76 captures the back of the read/write flex connector 174 to facilitate the pushing of that connector into the plug 80. On the underside of the pallet 156, a finger trigger 186 is provided which is integrally formed with the portions 182 and 184. This finger trigger allows an operator to selectively move the ejector 76 in the manner indicated by the arrow 188 to withdraw the connector 174 from the plug 80, or to alternatively push the connector into the plug. This is a desirable feature that minimizes damage which may occur by manually inserting and withdrawing the connector from the plug.

Similarly, the ejector 78 situated adjacent to the spindle flex plug 82 facilitates disconnecting the spindle motor connector 176 from the spindle flex plug 82. The ejector 78 is slidably mounted within the pallet 156, and includes a lower finger block 190 which supports two upwardly extending ejector pins 192 which lie on each side of the plug 82. As the finger block 190 is pressed upwardly, the ejector pins 192 engage a portion of the spindle flex connector 176 to disengage it from the spindle flex connector plug 82. This upward movement is indicated by the arrow 194 and FIG. 8B.

Figure 9:
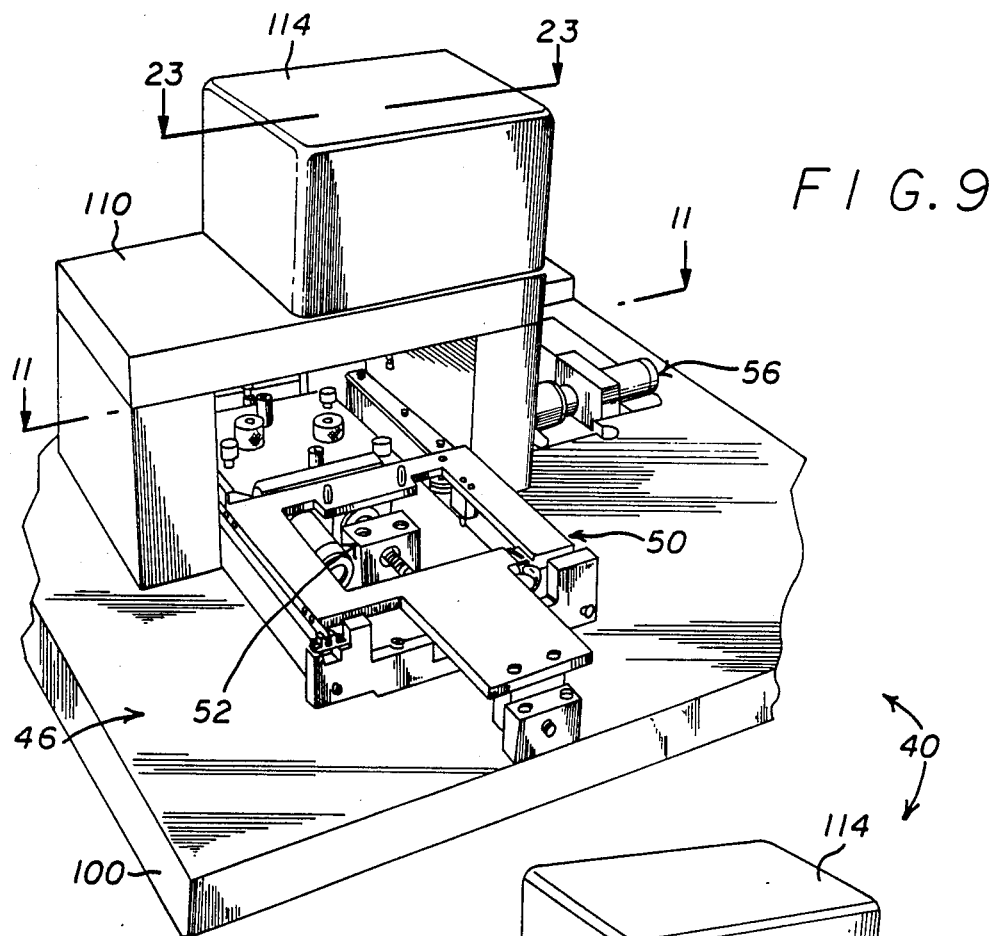
FIG. 9 is an enlarged fragmented perspective view of an upper portion of the servo track writer station illustrated in FIG. 1, illustrating the forward positioning of a carriage assembly prior to placing the pallet assembly thereon.
Figure 10:
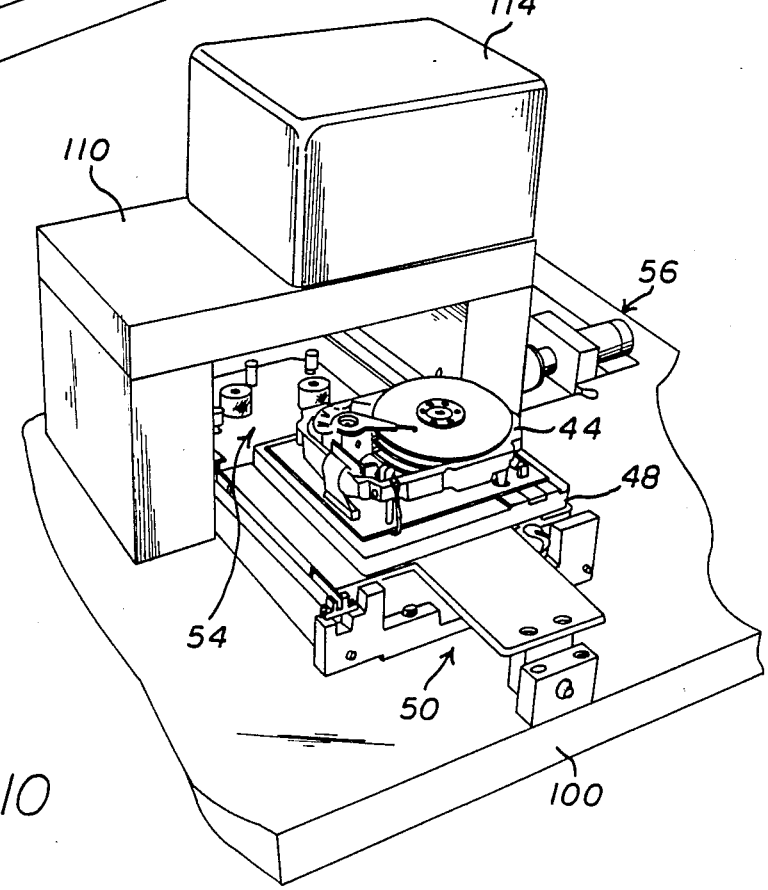
FIG. 10 is a perspective view of the upper portion of a servo track writer station similar to FIG. 9, illustrating the placement on the carriage assembly of a pallet assembly having an HDA strapped thereto (see FIG. 3)

Before placing the pallet assembly 48 having the HDA 44 attached thereto into the servo track writer station 40, the carriage assembly 50 must be extended to it forward-most position, as illustrated in FIG. 9. The carriage assembly 50 includes a carriage 196 and a pair of vertical locator pins 198 which extend upwardly from the carriage 196. When the pallet assembly 48 is placed upon the carriage assembly 50 as illustrated in FIG. 10, the vertical locator pins 198 fit within the vertical recesses located on the underside of the pallet 156, described above. This ensures consistent positioning of the pallet assembly upon the carriage 196 as the HDA 44 is drawn within the servo track writer station 40.

Figure 11:
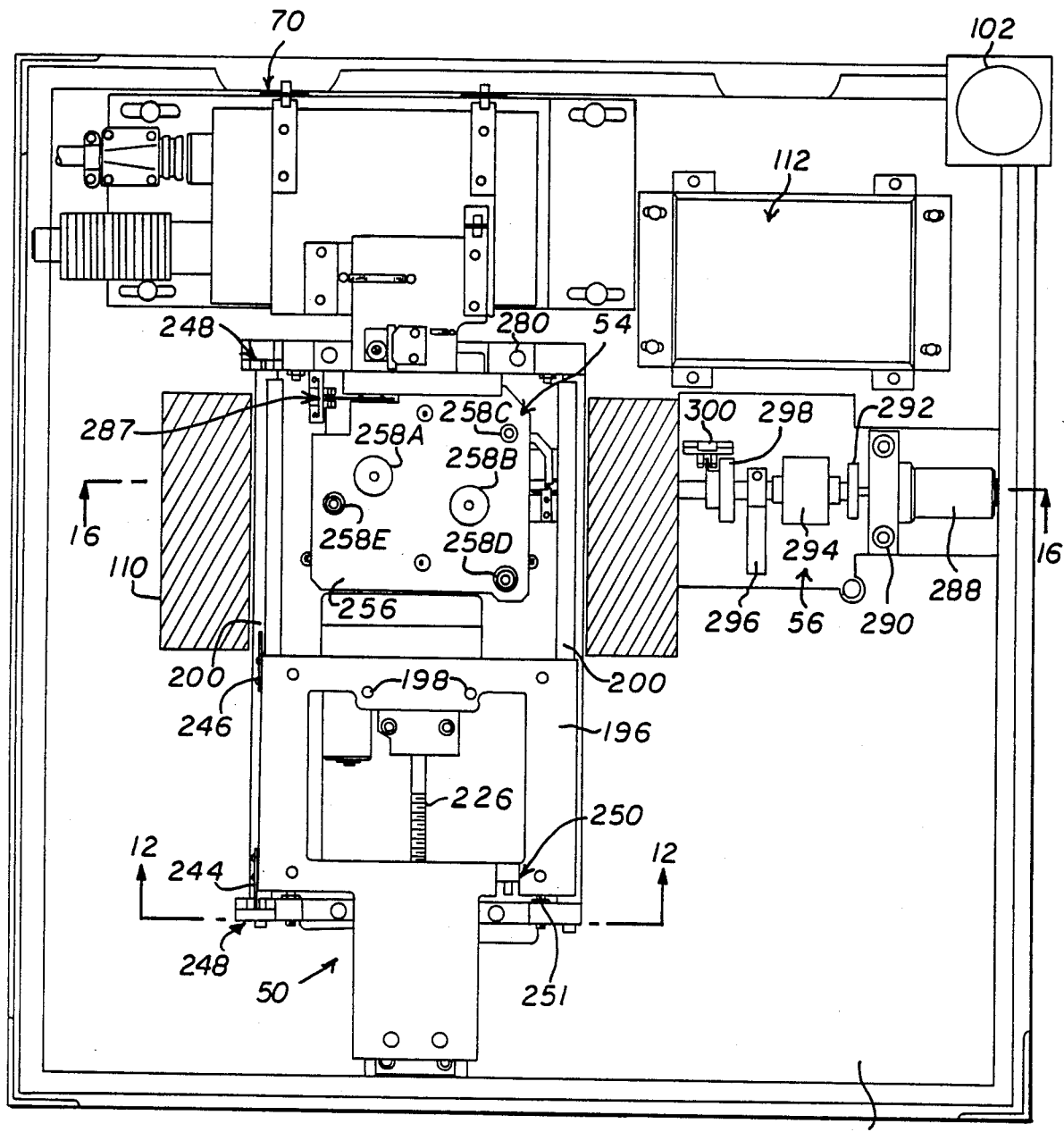
FIG. 11 is an enlarged, partially sectional plan view taken generally along the line 11—11 of FIG. 9.
Figure 12:
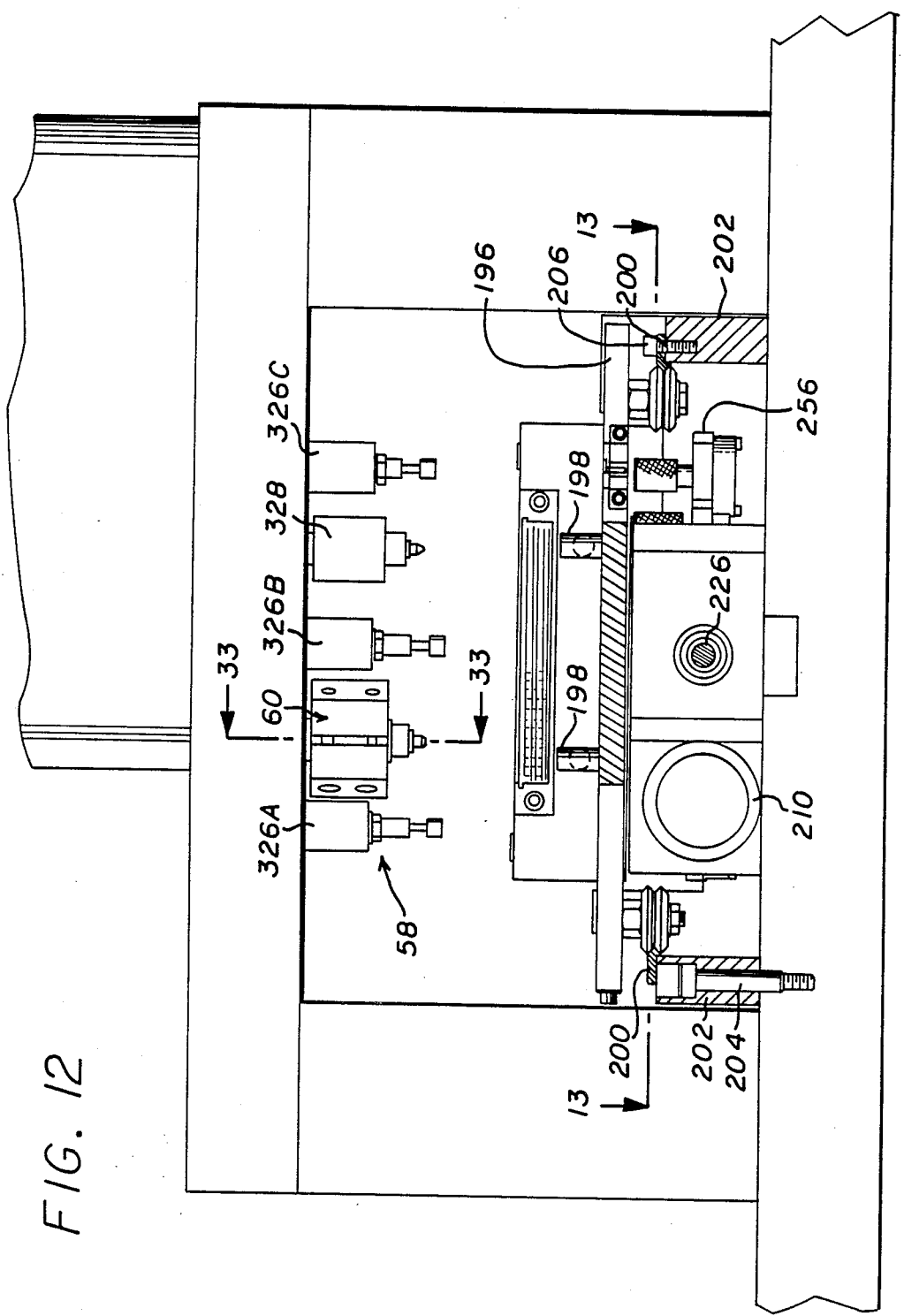
FIG. 12 is an enlarged elevational and partially sectional view taken generally along the line 12—12 of FIG. 11.
Figure 13:
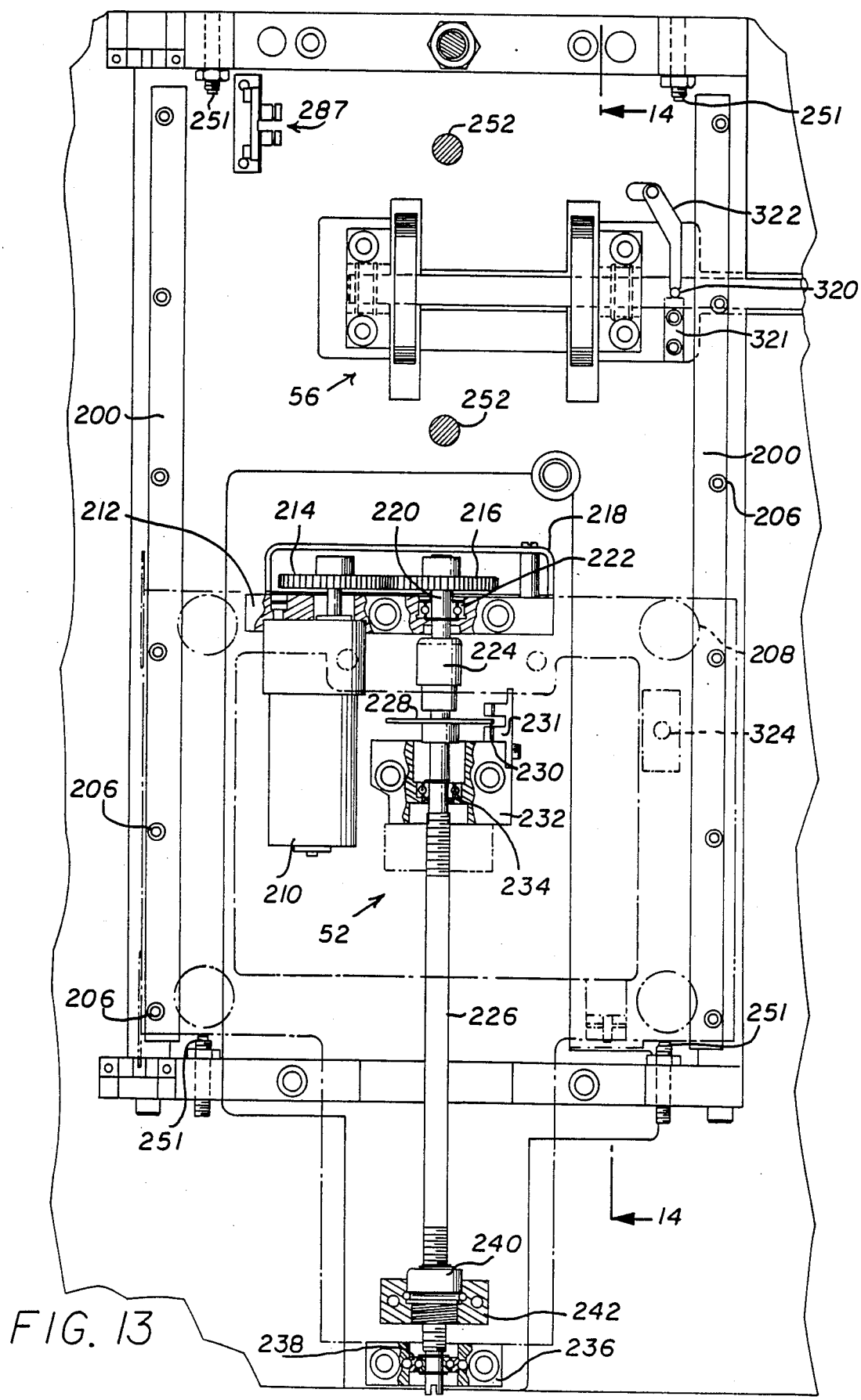
FIG. 13 is a partially fragmented sectional view taken generally along the line 13—13 of FIG. 12, illustrating, in part, the construction of a lead screw assembly for the carriage assembly.

With reference to FIGS. 11 through 13, the carriage assembly 50 and other components of the servo track writer station 40 which are attached to the aluminum plate 100, will be described in detail. The carriage 196 slides upon a track 200 which is positioned over the aluminum plate 100 by track blocks 202 secured to the aluminum block by counter-sunk block screws 204. The track 200 is fixed to the top of these track blocks 202 by screws 206 (see FIG. 12). The tracks 200 are parallel, and extend the length of travel of the carriage assembly 50. Four carriage wheels 208 are rotatably fixed beneath the carriage 196 in a manner which permits the carriage wheels to engage and be guided by the tracks 200. The carriage wheels 208 resemble vee-rollers.

The carriage assembly 50 is driven by the lead screw assembly 52 along the tracks 200, in accordance with preprogramed computerized instructions. The lead screw assembly 52 includes a gear motor 210 which is fixed to a motor block 212. The motor block is anchored to the aluminum plate 100. An output shaft from the lead screw motor 210 carries a spur gear 214 which meshes with an adjacent spur gear 216 aligned with the primary axis of the lead screw assembly. Both of these spur gears 214 and 216 are located within a carriage motor assembly cover 218, which is attached to the motor block 212. The lead screw spur gear 216 attaches to one end of a short shaft 220, which is supported by the motor block 212 at a bearing 222. The opposite end of the short shaft 220 is fixed to one half of a slip coupling 224, which couples the shaft 220 with the longer primary lead screw shaft 226. On the lead screw 226 and adjacent to the slip coupling 224 is provided a tach wheel 228 which includes a tach flag 230 which turns through an optical sensor assembly 231 for measuring the number of revolutions of the lead screw 226. Adjacent to this tach wheel 228 is a rear lead screw support 232 through which the lead screw 226 extends. The lead screw 226 is supported by a flanged bearing 234 within the rear support 232.

A front lead screw support 236 is provided at the opposite end of the lead screw 226. The lead screw 226 is supported Within the front lead screw support 236 by means of a bearing 238. Adjacent and rearward of the front lead screw support 236, is a fixed nut 240 through which the lead screw 236 turns. The fixed nut 240 is supported by and rigidly attached to a nut support 242, which is affixed to the underside of the carriage 196. As the lead screw 226 turns in response to rotation of the lead screw motor 210, the fixed nut 240 moves along the length of the lead screw. This movement of the the fixed nut 240 pulls the carriage 196 along the tracks 200. The position of the carriage is known by means of monitoring the number of revolutions of the lead screw 236 with the optical sensor assembly 231.

The position of the carriage assembly 50 is further monitored by means of a front carriage flag 244 and a rear carriage flag 246 mounted adjacent to the front and rear edges of the carriage 196. These flags 244 and 246 engage optical sensors 248 located at the forward and rearward points of travel of the carriage, in order to permit the station 40 to sense a fully inserted or fully withdrawn configuration of the carriage assembly. Further, an additional spring-loaded optical sensor 250 is provided on the upper surface of the carriage 196, to permit the station 40 to sense when the carriage assembly has been loaded with a pallet assembly 48. The allowed extreme forward and rearward travel of the carriage assembly 50 is manually adjustable by means of adjustable carriage stops 251.

Figure 15:
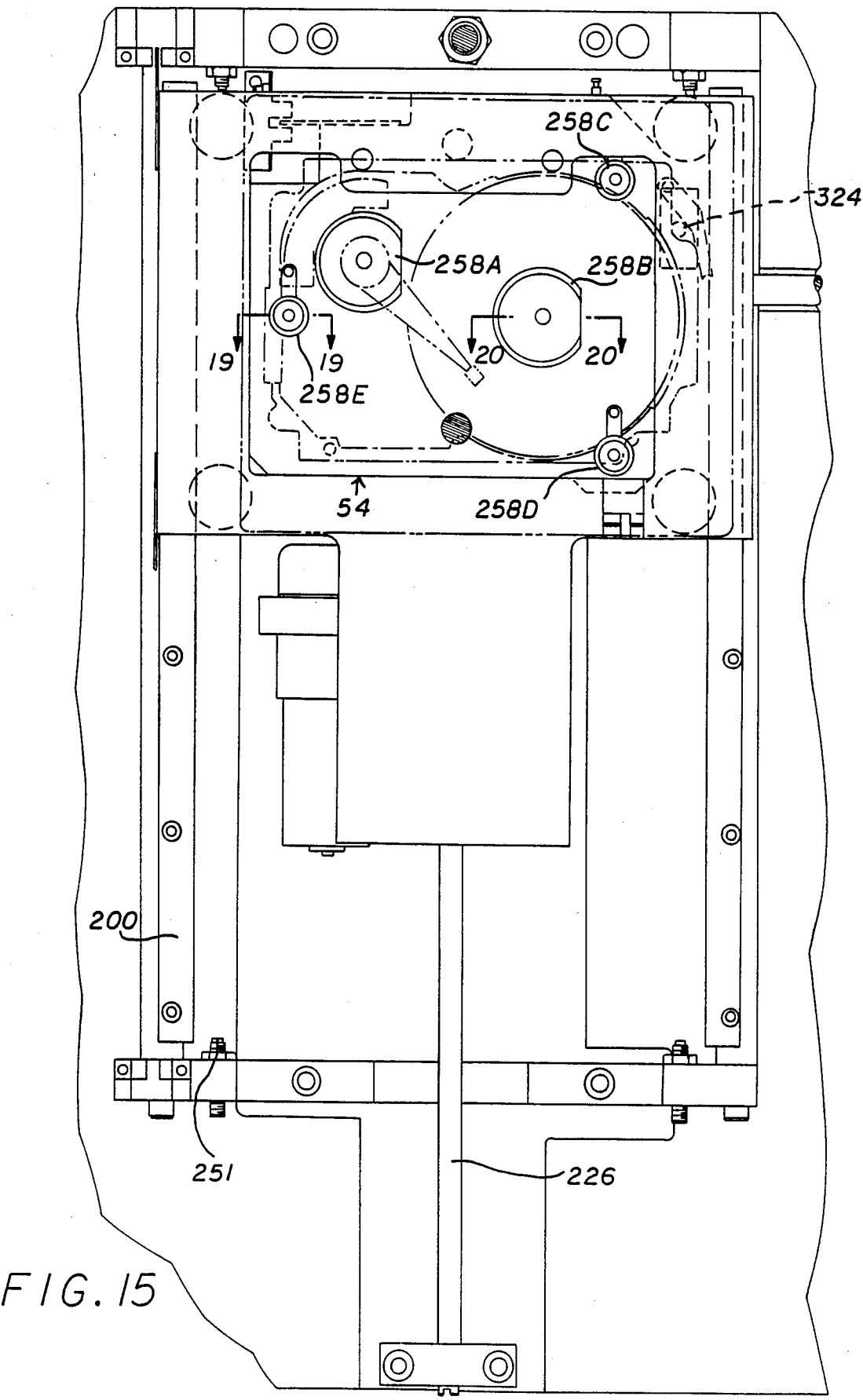
FIG. 15 is a fragmented plan view taken generally along the line 15—15 of FIG. 14, illustrating an HDA (in phantom) fully inserted by the carriage assembly within the servo track writer station.
Figure 16:
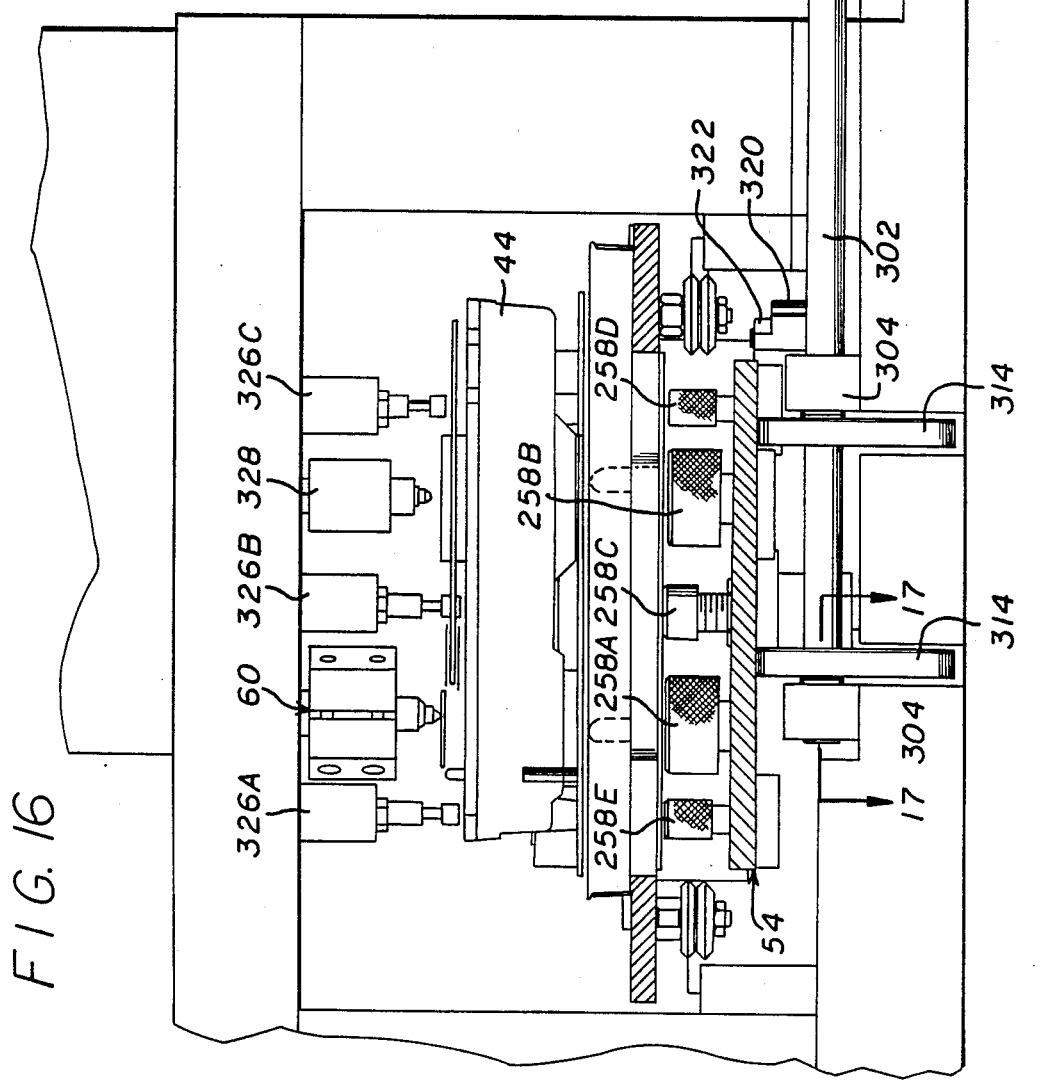
FIG. 16 is an enlarged vertical sectional view taken generally along the line 16—16 of FIG. 11, illustrating a camshaft assembly which is utilized to elevate the platten assembly, which in turn elevates the pallet assembly and the HDA into engagement with a top plate assembly.

With reference now to FIGS. 14 through 16, the carriage assembly 50 carries the pallet assembly 48 and the HDA 44 within the housing 110 in order to place the pallet assembly directly over the platten assembly 54. The platten assembly 54 comprises, generally, a platform providing five spring-loaded points of contact for the underside of the pallet 156, which platform is slidable upon two vertical platten guide pins 252 about corresponding linear bearings 254. More specifically, the platten assembly 54 includes a platten 256 through which five spring loaded plungers 258a-e are mounted. These spring loaded plungers are arranged on the platten 256 to directly underlie the engagement pads 162a-c and the precision inserts 164 provided within the pallet 156. Thus, as the pallet assembly 48 is lifted by the platten assembly 54, the only contact between the two is at specific, highly controlled points.

Figure 19:
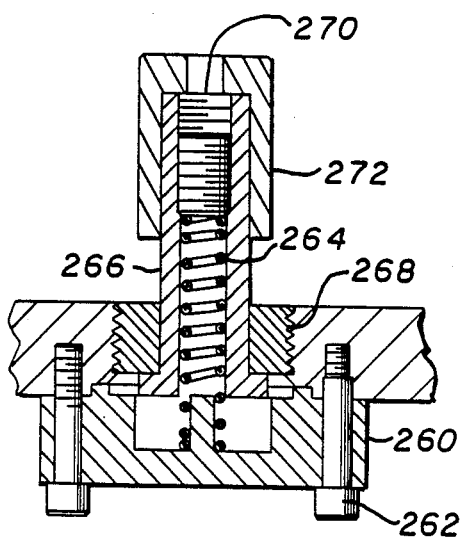
FIG. 19 is an enlarged fragmented sectional view taken generally along the line 19—19 of FIG. 15, illustrating the construction of a spring loaded plunger comprising a portion of the platten assembly.
Figure 20:
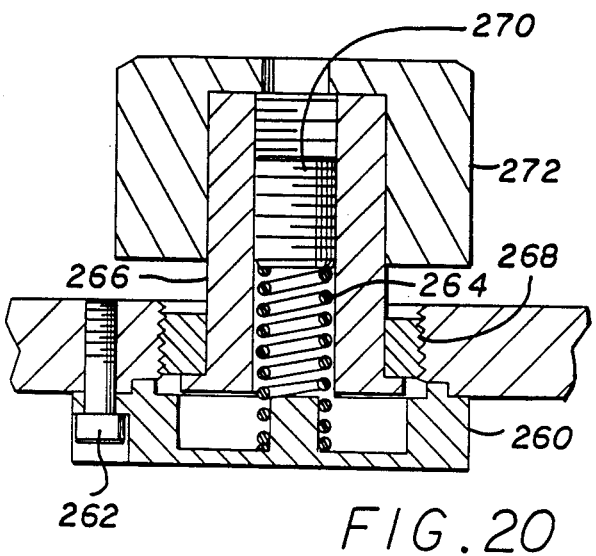
FIG. 20 is an enlarged fragmented sectional view taken generally along the line 20—20 of FIG. 15, illustrating the construction of another spring loaded plunger forming a portion of the platten assembly.
Figure 21:
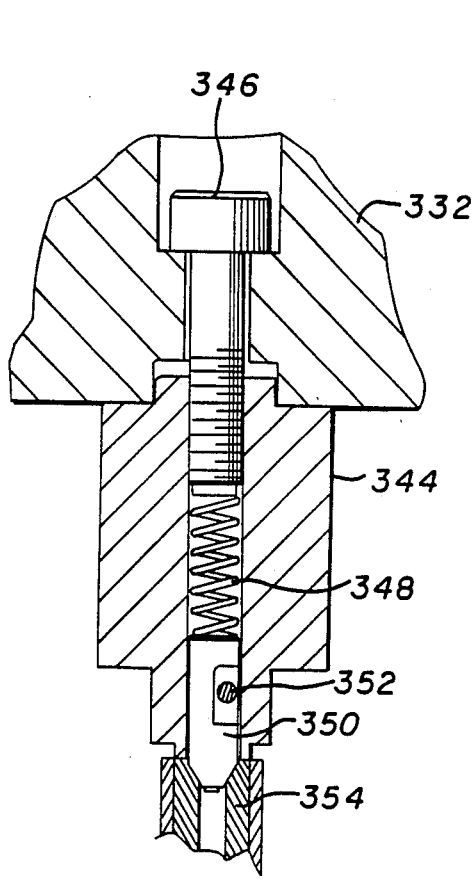
FIG. 21 is an enlarged fragmented sectional view taken generally along the line 21—21 of FIG. 18, illustrating the construction of a spindle shaft assembly and the manner in which it engages a spindle shaft of the HDA.
Figure 22:
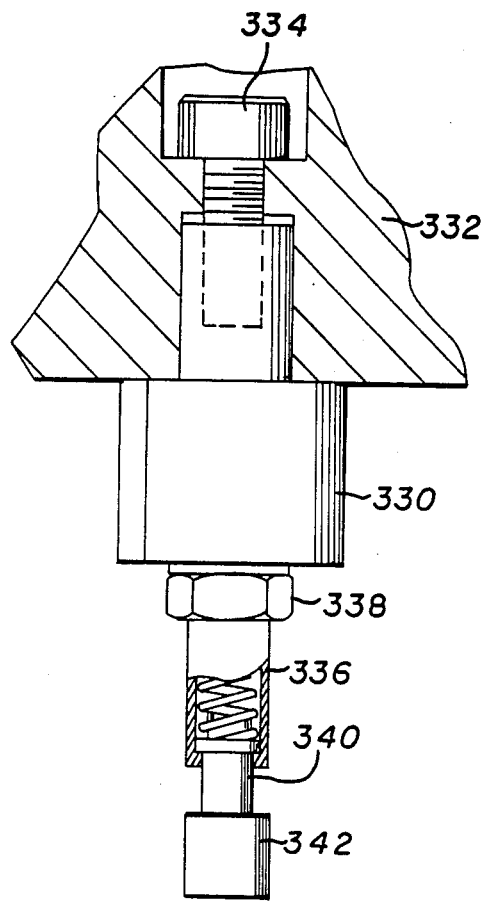
FIG. 22 is an enlarged fragmented sectional view taken generally along the line 22—22 of FIG. 18, illustrating the construction of a plunger assembly forming a portion of the top plate assembly and which, when the platten assembly is elevated, engages an upper surface of the HDA.
Figure 23:
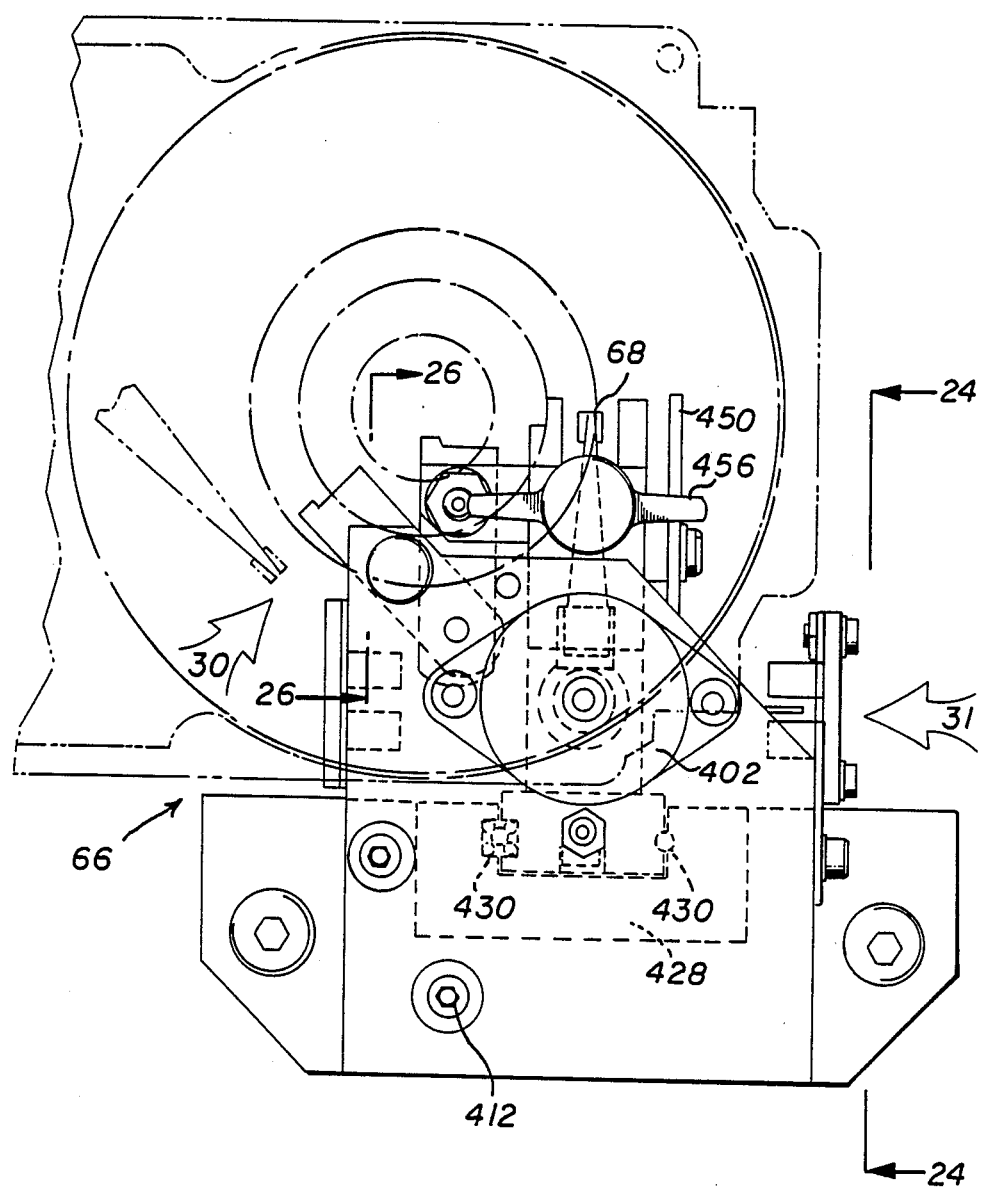
FIG. 23 is a top plan view of a clock head assembly taken generally along the line 23—23 of FIG. 9.
Figure 24:
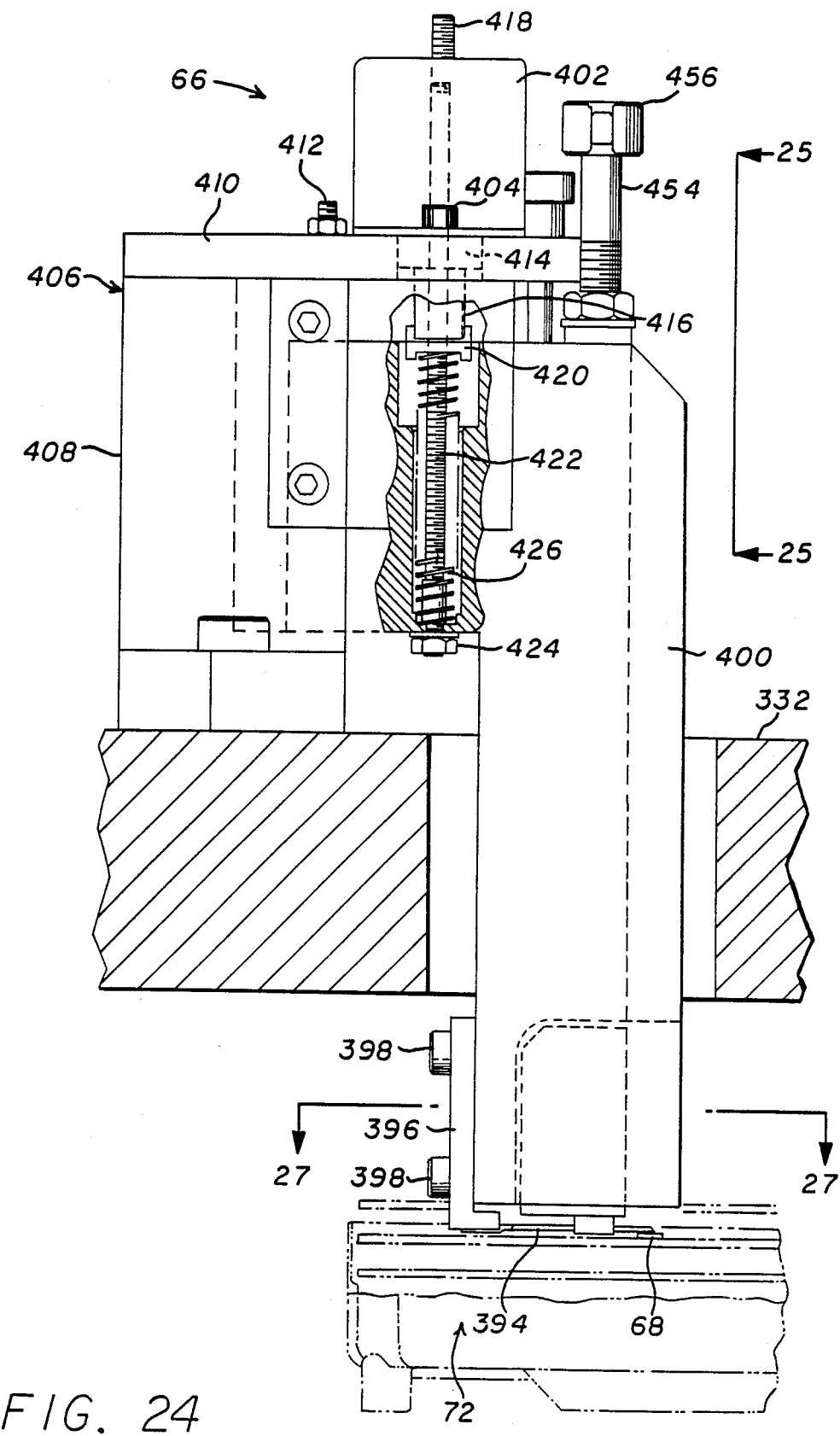
FIG. 24 is a vertical and partially sectional view taken generally along the line 24—24 of FIG. 23, illustrating components associated with a sliding arm of the clock head assembly, which places a clock head into engagement with an upper surface of a selected hard disk.
Figure 25:
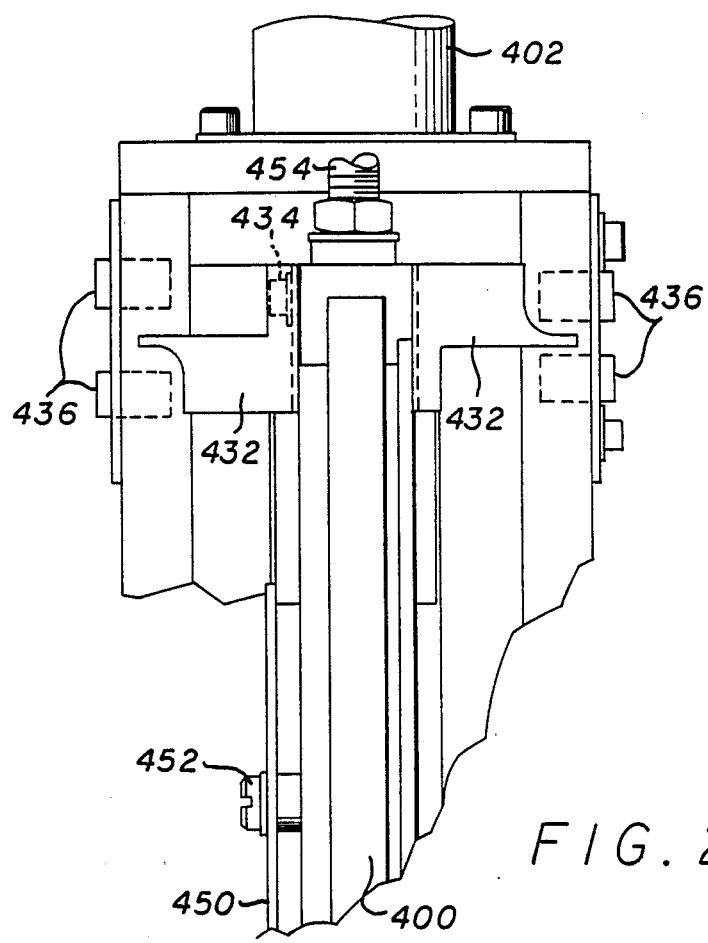
FIG. 25 is an elevational view of the clock head assembly taken generally along the line 25—25 of FIG. 24.

As illustrated in FIGS. 19 and 20, although the plungers 258 differ in size, they are similar in construction. More particularly, each of the plungers includes a bottom cap 260 which is secured by screws 262 to the underside of the platten 256. A spring 264 extends through an aperture of the platten and the spring is encased by a sheath 266. The sheath 266 is held in place by a nut 268 which is used to adjust the overall height of the plunger. The nut 268 is locked into place by any suitable means. An adjustable set screw 270 is threaded within the upper end of the sheath 266 to place the spring 264 into compression. Adjustment of the set screw correspondingly adjusts the compression of the spring 264. Finally, a cap 272 is placed over the end of the sheath 266, to provide a suitable contact area for the bottom side of the pallet assembly 48.

Associated with the platten assembly 54 is a connector assembly 274 which receives the rearward edge of the pallet 256, and provides an electronic connection means between the STW connector 170 and the servo track writer station 40. More particularly, the connector assembly 274 includes an STW connector plug 276 which is aligned with the STW connector 170. As the carriage assembly 50 travels rearwardly into the station 40, the plug 276 and connector 170 interconnect to provide an electronic data transmission link between the servo track writer station 40 and the HDA 44. The STW connector plug 276 is mounted to a connector support assembly 278 which is capable of sliding vertically upon two connector guide pins 280 through linear bearings 282. Extending horizontally outwardly from the connector support assembly 278 toward the pallet 156, are two horizontal guide pins 284 which, when the pallet 156 is carried within the writer station 40, are inserted within the horizontal recesses 161. Further, a spring 286 connects the connector assembly 274 to the platten 256, to ensure that as the platten assembly 54 moves downwardly, the connector assembly 274 will likewise move downwardly. An optical sensor 287 is fixed to the aluminum plate 100 to permit the station 40 to detect when the platten is in a "down" configuration.

With reference to FIGS. 16 through 18, after the pallet assembly 48, with the attached HDA 44, is fully positioned within the housing 110, the platten assembly 54 is elevated from the down configuration by means of the camshaft assembly 56 to place the HDA 44 in direct contact with the top plate assembly 58. The camshaft assembly 56 includes a camshaft motor 288 fixed to the aluminum plate 100 by means of a motor support 290. Attached to an outlet shaft of the camshaft motor 288 is a shaft adapter 292 which, in turn, is fixed to a slip coupling 294. The slip coupling 294 is attached, opposite the camshaft motor 288, to a manual override handle 296, which permits an operator to elevate the platten assembly 54 manually. The manual override handle 296 is, in turn, attached to a flag assembly 298 which interacts with a camshaft optical sensor 300 to signal completion of the elevation of the platten assembly 54. It should be noted that the camshaft assembly 56 is intended only to rotate through 180° of rotation. Thus, the optical sensor 300 is provided simply to verify that the platten 256 is in the desired elevated position. When the flag assembly 298 and the camshaft optical sensor 300 do not send a "flaged-condition" signal, then the writer station 40 knows that the platten assembly is not fully elevated.

A camshaft 302 extends away from the flag assembly 298 through the housing 110, and is supported over the aluminum plate 100 by means of two support housings 304. The support housings 304 are attached to the aluminum plate 100 by means of screws 306, and they each include bearing 308 by which the camshaft 302 is permitted to rotate through the support housings 304. Retaining rings 310 and preloaded springs 312 ensure that the bearings 308 and the camshaft 302 remain properly positioned with respect to the support housings 304.

A pair of cams 314 are eccentrically positioned upon the camshaft 302 between the support housings 304, and are held in place thereon by means of a lock pin 316 (see FIG. 17). A peripheral bearing 318 is situated about the periphery of each of the cams 314 to minimize friction between the bottom surface of the platten 256 and the cams 314.

The camshaft 302 is also provided with a radially outwardly extending stop pin 320, the function of which is best described with reference to FIGS. 13, 15 and 16. The purpose of the stop pin 320 is to disallow any rotation of the camshaft unless the carriage assembly 50 is fully inserted into the housing 110. In this regard, the stop pin 320 is attached to the camshaft 302 so as to extend generally vertically from the camshaft when the platten assembly 54 is in its lowermost position. In order to prevent counter-clockwise rotation of the camshaft 302 when the stop pin 320 is in a vertical upright position, a stop block 321 is fixed to the aluminum plate 100. An angular stop arm 322 is pivotally mounted to the aluminum plate 100, and is spring-biased to a closed position which bears against one side of the stop pin 320 (see FIG. 13). The underside of the carriage 196 includes a stop release pin 324 which engages a mid-section portion of the stop arm 322 as the carriage assembly 50 moves into the housing 110, which causes rotation of the stop arm 322 away from and out of engagement with the stop pin 320. Only after the stop arm 322 is disengaged from the stop pin 320 by the release pin 324, is the camshaft 302 permitted to rotate in order to elevate the platten assembly 54.

With reference now to FIGS. 12, 18, 21, 22 and 33, as the camshaft assembly 56 turns through its 180° rotation to lift the platten assembly 54, the HDA 44 contacts the top plate assembly 58. The top plate assembly includes the housing 110 previously discussed, three plunger assemblies 326, a spindle shaft assembly 328, and the arm assembly 60. The plunger assemblies 326, the spindle shaft assembly 328 and the arm assembly 60, all extend downwardly from a portion of the housing 110 to engage the HDA 44 at locations generally opposite the spring loaded plungers 258 provided as part of the platten assembly 54. These five points of contact on both the upper and lower surfaces of the HDA 44 tend to minimize any vibration to the HDA as clock and servo data are written on selected hard disks 64.

The plunger assemblies 326 (FIG. 22) each include a standoff 330 fixed to an overlying top plate 332 of the housing 110 by means of a cap screw 334, a spring housing 336 fixed to the standoff by means of a nut 338, a tip 340 which extends downwardly from the spring housing, and a pad 342 which overlies the end of the tip. These plunger assemblies 326 are located by the top plate 332 so that as the HDA 44 is elevated, they contact the HDA housing 140 at points which overlie the engagement pad 162c and the precision inserts 164.

The spindle shaft assembly 328 (FIG. 21) includes a standoff 344 anchored to the top plate 332 by means of a cap screw 346. The standoff 344 includes an internal bore in which a spring 348 is situated, and the spring is retained within the bore by means of a plunger tip 350 which is held in place by a pin stop 352. The spindle shaft assembly 328 is situated within the top plate 332 to directly overlie the engagement pad 162b, which itself is situated to directly underlie the spindle shaft 354 of the HDA disk pack assembly 144.

Similarly, the arm assembly 60 (FIG. 33) functions not only as a damper for the HDA 44, but also as a means for controlling movement of the HDA actuator assembly 148 during application of servo data onto the servo surface 72. The arm assembly 60 includes a stationary shaft 356 which is anchored to the top plate 332 by means of a cap screw 358. The lower end of the shaft 356 includes a pin 360 which engages an upper portion of an HDA actuator assembly shaft 362. A pair of bearings 364 surround a portion of the shaft 356 and are held in place by means of a retaining ring 366 and a preloaded spring 368. The bearings 364 are enclosed within a bearing housing 370 which, in turn, is enclosed by an end of a positioner arm 372. The positioner arm 372 is securely clamped about the bearing housing 370 by means of bolts 374.

Fixed to the bottom of the positioner arm 372 by means of a cap screw 376, is a crash stop pin drive assembly 378. The drive assembly 378 includes a square pin 380 which extends downwardly and generally parallel to the longitudinal axis of the shaft 356, and is positioned to engage the crash stop pin 153. It is through the direct contact between the crash stop pin 153 and the square pin 380, that the arm assembly 60 is capable of controlling the movement of the actuator assembly 148 during application of servo data to the servo surface 72, in a controlled and precise manner.

The opposite end of the positioner arm 372 includes another stationary shaft 382 which is mounted to the arm by means of a cap screw 384. A pair of bearings 386 are mounted onto the shaft 382, and are maintained in place by means of a spring 388. These bearings 386 function as a shaft follower, and the function thereof will be described in more detail below in connection with the positioner assembly 70. Additionally, the positioner arm 372 includes a pin 390 which serves as an anchor point for a spring 392 which flexibly connects the positioner arm 372 to a portion of the positioner assembly 70.

With reference now to FIGS. 23 through 31, the clock head assembly 66 will be described. The clock head assembly 66 operates to apply clock data to an upper surface of any one of the top three disks 64 of the disk pack assembly 144. After the pallet assembly 48 has been lifted up by the camshaft assembly 56 to place the HDA 44 into engagement with the top plate assembly 58, the clock head assembly 66 is activated to lower the clock head 68 and place it in direct contact with a selected one of the hard disks 64.

The clock head 68 is attached to a clock head flexure 394 which is supported by a clock head support bracket 396. The bracket 396 is attached by bolts 398 to a lower end of a sliding arm 400. The sliding arm 400 extends through an opening in the top plate 332, and moves in response to movement of a lead screw motor 402 situated beneath the cover 114 for the clock head assembly 66.

The lead screw motor 402 is mounted by means of cap screws 404 to a support assembly 406 for the clock head assembly 68. This support assembly 406 includes an upstanding vertical support 408 and a cover plate 410. Bolts 412 secure the support assembly 406 in place over the top plate 332.

Immediately beneath the lead screw motor 402 is a pilot 414 and bushing 416 assembly which travels upwardly and downwardly on the lead screw 418 in response to rotation thereof. Attached to the bottom of the bushing 416 is a clamp 420. The clamp 420 is further attached to a bolt 422 which extends vertically through a portion of the sliding arm 400. The bolt 422 does not turn with rotation of the lead screw 418, but rather provides means for adjusting the precise location of the sliding arm 400 with respect to the support assembly 406. The bolt 422 is provided a lock nut 424 at the bottom end thereof, and a pre-loaded spring 426 extends within the sliding arm between the clamp 420 and the lock nut 424.

The sliding arm 400 is mounted within a guide block 428, which in turn is supported within the support assembly 406. The guide block 428 supports vertical bearings 430 along which the sliding arm 400 moves. Attached to the upper portion of the sliding arm 400 are two flags 432 which are attached by means of cap screws 434 and extend outwardly to interface with optical sensors 436 fixed to the support assembly 406. More particularly, with reference to FIG. 31, the optical sensors 436 are bolted to a bracket 438 by means of a nut 440, washer 442 and bolt 444. Slots within the bracket 438 permit the optical sensor 436 to be precisely adjusted to a location deemed most desirable relative to movement of the respective flag 432. The bracket 438 is, in turn, bolted to the support assembly 406 by means of a cap screw 446 and washer 448.

On one side of the sliding arm 400, the optical sensors are arranged to sense the upper desired limit of travel of the sliding arm, and the lower desired limit of travel. This provides feedback for the electronic components of the servo track writer station 40, which control movement of the sliding arm 400. Another set of optical sensors are provided to sense intermediate locations of the sliding arm, to precisely position the clock head 68 on the upper surface of a desired hard disk 64.

A printed circuit board 450 is also attached by a bolt 452 to the sliding arm 400, and it communicates directly with the clock head 68 and a flex cable (not shown). Moreover, a manual override handle 454, having an upper tee-grip 456 is attached directly to the sliding arm 400 to permit manual override of movement of the sliding arm.

Figure 26:
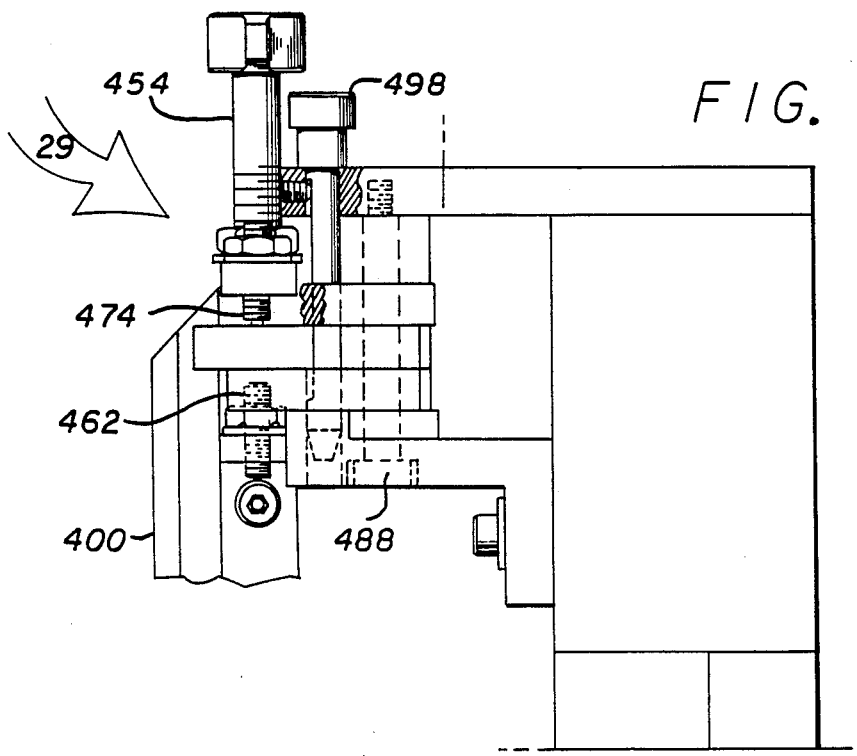
FIG. 26 is a vertical, partially sectional view taken generally along the line 26—26 of FIG. 23, illustrating, in part, components of a manual override handle comprising a portion of the clock head assembly.

With specific reference to FIGS. 26, 29 and 30, a manual stop mechanism is provided as part of the clock head assembly 66 in order to ensure that overtravel of the sliding arm 400 does not occur. Attached to the sliding arm 400 is a lower bracket 458 which is bolted thereto by a cap screw 460. Threaded through this bracket 458 is a lower stop screw 462 which is anchored in place by means of a washer 464 and nut 466. Spaced from this lower bracket 458 is an upper bracket 468 which is held in place on the sliding arm 400 by means of the manual override handle 454 and another nut 470 and washer 472 combination. An upper stop screw 474 is threaded through the upper bracket 468, and secured in place by means of another nut 476 and washer 478 combination.

Situated generally adjacent to the manual stop structure described above but anchored to the support assembly 406, is a stop arm assembly 480 (FIG. 30). The stop arm assembly 480 includes a bracket 482 which is attached to a portion of the vertical support 408 which partially surrounds the sliding arm 400, by means of a mounting screw 484 and washer 486. A pivot pin 488 extends upwardly through the bracket 482, and a lower end thereof rests within a well provided in the vertical support 408. Three pivotable stops 490 are stacked upon a portion of the pivot pin 488 extending above the bracket 482, a spacer 492 is stacked onto the pivot pin 488 above the stops 490, and then an upper tip of the pivot pin 488 extends through a recess provided in the cover plate 410. Each of the pivotable stops 490, when thus assembled, is capable of swinging between a neutral position wherein they are incapable of affecting movement of the sliding arm 400, and an operational position between the lower stop screw 462 and the upper stop screw 474. The pivotable stops 490 include aligned apertures through which a locking pin 494 may be inserted (through the cover plate 410 and locked into place by means of a set screw 496), to hold the pivotable stops 490 in their neutral configuration. Any one of the pivotable stops 490, however, may be selectively moved to a location between the upper and lower stop screws, and securely held in place.

In this regard, the cover plate 410 and the bracket 482 include aligned apertures which are capable of accepting and retaining a removable pin 498. When a pivotable stop 490 is placed between the upper and lower stop screws 462 and 474, an aperture in the pivotable stop becomes aligned with the apertures in the cover plate and the bracket. The removable pin 498 may be inserted through all three aligned apertures to hold the selected pivotable stop in place.

Figure 27:
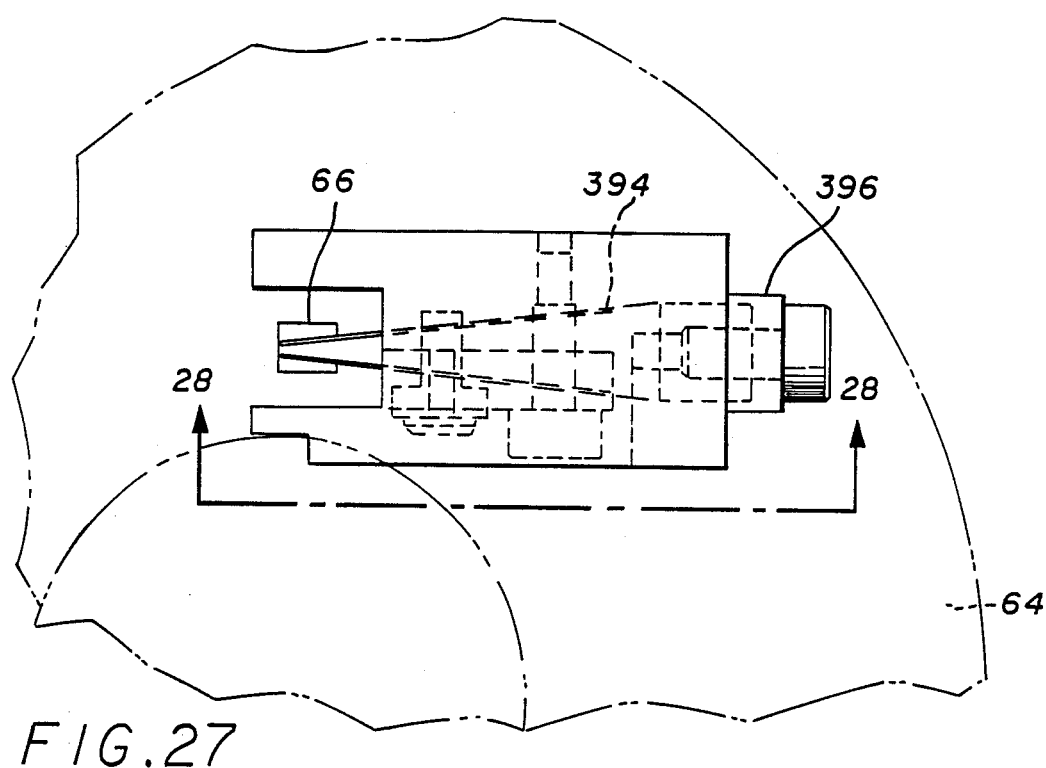
FIG. 27, is an enlarged horizontal section taken generally along the line 27—27 of FIG. 24, illustrating the clock head and components closely associated therewith.
Figure 28:
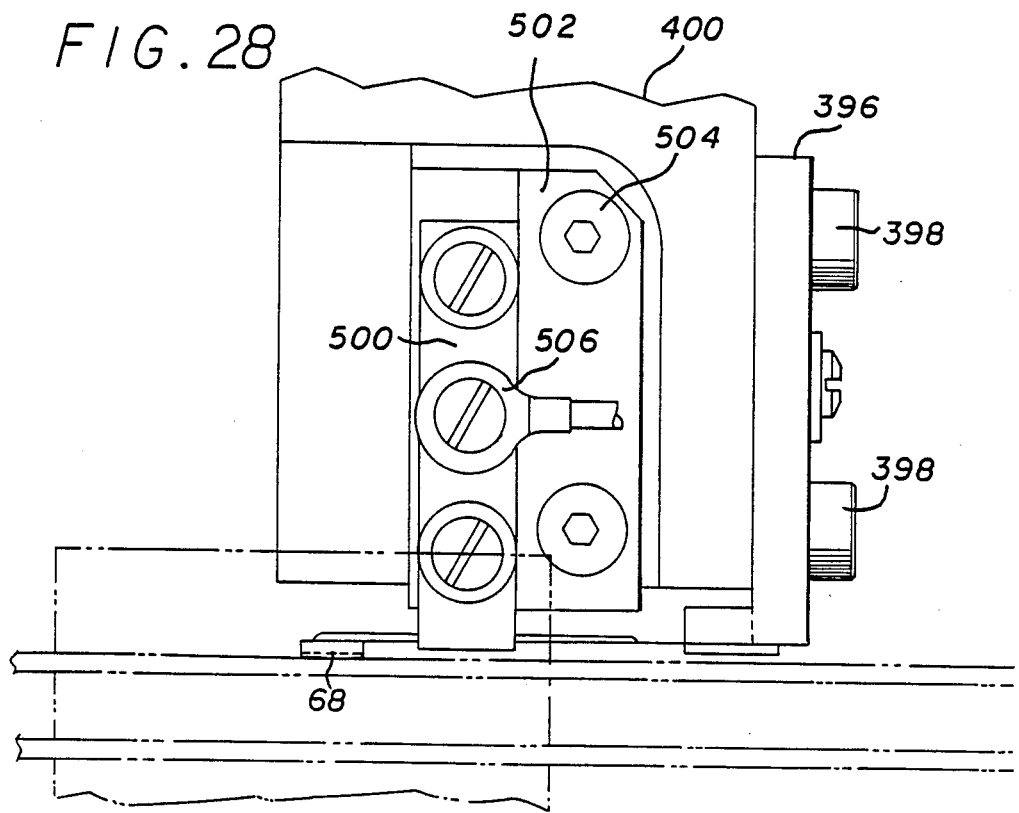
FIG. 28 is an elevational view taken generally along the line 28—28 of FIG. 27, illustrating a support bracket and switch arrangement associated with the clock head.

With reference specifically to FIGS. 27 and 28, a terminal strip 500 is attached to the lower end of the sliding arm 400 by means of a terminal strip bracket 502 via mounting bolts 504. Attached to the terminal strip 500 is a connector 506 which provides a feedback loop to the electronics of the servo track writer station 40, to indicate actual contact made between the clock head 68 and the upper surface of a hard disk 64. The clock head 68 and the terminal strip 500 function as a switch through the provision of narrowly spaced and oppositely facing gold strips which only come into contact with one another as the clock head 68 contacts the hard disk. Upon such contact, the gold surfaces meet, and complete a circuit which feeds a signal to the servo track writer station electronics to indicate such contact. The bracket 502 is adjustable with respect to the lower end of the sliding arm 400 to permit this contact gap to be finely-adjusted.

Following application of clock data to a limited area on the upper surface of one of the hard disks 64, the positioner assembly 70 begins to precisely move the arm assembly 60, which in turn causes precise movement of the HDA actuator shaft 62, to apply servo data to the servo surface 72. More particularly, and with reference to FIGS. 32 through 34, the positioner assembly 70 is located primarily rearwardly of the housing 110. The positioner assembly comprises a Klinger motor unit 508, such as Klinger motor unit Model UT 100, manufactured by Klinger Scientifics, 110-20 Jamaica Avenue, Richmond Hill, N.Y. 11418-9970.

The Klinger unit 508 is mounted to an adapter plate 510, which in turn is adjustably mounted to the aluminum plate 100 by means of bolts 512. The Klinger unit 508 includes a power connector 514 which receives a power cord 516, and a precision stepper motor 518 which linearly drives a positioner table 520. Mounted onto the positioner table 520 is a microslide stage plate 522 which carries a mechanism for precisely moving the shaft follower 386 forming a portion of the arm assembly 60.

In order to monitor when the stage plate 522 has reached the limits of desired linear travel, sensor brackets 524 are mounted along an edge of the adapter plate 510. These extend upwardly to support optical sensors 526 which interface with flags 528 affixed to an upper surface of the stage plate 522 by cap screws 530.

A series of adjustable plates are arranged on the stage plate 522 to accurately control the positioning of the shaft follower 386, and also prevent damage to components of the servo track writer station 40 and the HDA 44 should the Klinger unit 508 move the positioner table 520 beyond expected limits. More particularly, a microslide 532 is placed upon the stage plate 522, but is not fixed thereto. Attached to the top of the microslide 532 is microslide adapter plate 534 which is bolted thereto by cap screws 536. These cap screws 536 also position a flag 538 atop the adapter plate 534, which interfaces with an override optical sensor 540 which is mounted to a bracket 542, which bracket is fixed to the stage plate 522. The microslide adapter plate 534 is provided an opening beyond the edge of the underlying microslide 532, wherein the shaft follower 386 is positioned. An adjustable clamp 544 and gage block 546 position the shaft follower 386 within the opening of the adapter plate 534.

A stop bracket 548 is adjustably fixed by means of bolts 550 to the stage plate 522. An upper surface of the stop bracket 548 carries a pin 552, to which a spring 554 is attached. This spring 554 is attached at the other end to another pin 556 which extends upwardly from the microslide adapter plate 534. The purpose of this spring is to hold the microslide adapter plate 534 in constant contact with an abutting side of the stop bracket 548.

The above-described structure associated with the microslide adapter plate 534 is specifically constructed to prevent damage to the arm assembly 60 and/or the HDA actuator assembly 148 due to overtravel of the positioner table 520. In this regard it should be noted that the stop bracket 548 and the optical sensor 540 are each fixed upon the microslide stage plate 522. If, for some reason, the stage plate 522 moved too far to the left (as viewed in FIG. 34) wherein the arm assembly 60 could not rotate further, the particular arrangement described above would permit the adapter plate 534 and the microslide 532 to remain stationary at the extreme limit of travel, and allow the override optical sensor 540 and stop bracket 548 to continue moving with the stage plate 522. Such continued movement would cause the flag 538 to disengage from the optical sensor 540, signalling to the servo track writer station 40 that over-travel of the stage plate 522 had occurred. This would allow the writer station 40 to immediately cease operation of the Klinger unit 508, and minimize or prevent any damage to the unit. The spring 554 permits such separation of the adapter plate 534 from the stop bracket 548, but ensures that these two components again come into abutting contact as soon as the over-travel of the stage plate 522 is eliminated.

Prior to applying clock information utilizing the clock head assembly 66, the hard disks 64 within the HDA 44 are accelerated to operational speed. After the clock information is applied, then the servo track writer station 40 activates the positioner assembly 70 to first erase the servo surface 72 of any pre-applied information, and then precisely move the read/write head 74 adjacent to the servo surface to apply servo data generated by the writer station 40. The writer station 40 supplies servo data to the HDA read/write head 74 while simultaneously precisely controlling the positioning of the read/write head by means of the arm assembly 60. Movement of the HDA actuator arms 150 within the HDA actuator assembly 148 is effected by contact between the square pin 380 (forming a portion of the crash stop pin drive assembly 378 on the arm assembly 60), and the crash stop pin 153 provided with the HDA actuator assembly 148.

When utilizing the servo track writer station 40 to apply servo information a selected disk within the HDA 44, the operator first assures himself that the granite assembly 46 is level and that proper information is loaded into the station 40 through the keyboard 106. The writer station 40 will automatically verify that the clock head assembly 66 is unloaded, that the platten assembly 54 is down, and that the positioner assembly 70 has situated the arm assembly 60 in a home position.

The operator places the HDA 44 onto the pallet assembly 48, and straps it securely in place utilizing the straps 160. After the HDA 44 has been strapped onto the pallet assembly 48, the read/write flex connector 174 is pressed into the read/write flex connector plug 80 with the assistance of the ejector 76. Similarly, the spindle motor connector 176 is pressed into the spindle flex plug 82. This new assembly comprising the pallet assembly 48 and the HDA 44 is then loaded onto the carriage assembly 50 by positioning the vertical locator pins 198 on the carriage 196 into receptacles on the underside of the pallet 156. By so positioning the pallet assembly 48, the optical sensor assembly 250 provides a signal to the writer station electronics which signifies that the carriage assembly 50 is properly loaded.

The writer station 40 automatically activates the lead screw motor 210, which draws the pallet assembly 48 and the HDA 44 into the housing 110. Movement of the carriage assembly 50 is monitored by means of the tach wheel 228 and its associated optical sensor assembly 231.

Completion of travel of the carriage assembly 50 into the housing 110 is monitored by insertion of the rear carriage flag 246 into the rear carriage travel optical sensor 248. Movement of the pallet assembly 48 fully into the housing 110 causes the STW connector 170 to mate with the STW connector plug 276. This forms an electronic connection between the HDA 44 and the components situated therein, and the servo track writer station 40.

The camshaft assembly 56 is then activated to rotate through one 180° turn, to lift the platten assembly 54 into engagement with the underside of the pallet assembly 48, and lift the HDA 44 into engagement with the top plate assembly 58. The platten assembly 54 and the top plate assembly 58 include spring loaded plungers which tend to isolate the HDA 44 from vibration.

With the HDA 44 in this elevated position, the clock head assembly 66 is then activated to lower a sliding arm 400 and place the clock head 68 adjacent to an upper surface of a selected disk. The disk pack assembly 144 within the HDA housing 140 then begins to rotate and accelerates to normal operating speed. After the clock data has been applied to the selected disk and that disk has been tested by the servo track writer station 40, the clock head 68 is withdrawn, and the positioner assembly 70 is activated.

The function of the positioner assembly 70 is to precisely control the positioning of an HDA read/write head 74 which is adjacent to the selected servo surface 72. Typically, the selected servo surface 72 will be the lower surface of the lowermost hard disk in a disk stack. The positioner assembly 70 controls movement of the HDA actuator assembly 148 so that the servo data can be applied utilizing the HDA read/write head 74, and not a separate read/write head provided by the servo track writer station 40.

The arm assembly 60, which provides a link between the positioner assembly 70, the top plate assembly 58 and the HDA 44, includes a crash stop pin drive assembly 378. This drive assembly 378 includes a square pin 380 which bears directly against the crash stop pin 153 forming a portion of the HDA actuator assembly 148. The HDA actuator assembly 148 is controlled by the servo track writer station 40 to the extent that the crash stop pin 153 constantly bears against the square pin 380. Thus, the HDA actuator assembly 148, and specifically the HDA read/write head 74 adjacent to the servo surface 72, moves only in response to movement of the square pin 380.

Initially, the HDA read/write head 74 moves over the servo surface 72 to erase any prior-applied data. Next, the Klinger unit 508 precisely positions the HDA read/write head 74 by controlling the movement of the shaft follower 386, which in turn moves the square pin 380. This precise movement is coordinated with servo data being fed by the servo track writer station 40 to the HDA read/write head 74, for application onto the servo surface 72.

After the desired clock and servo data have been applied to the hard disks 64, the positioner assembly 70 returns to a home position, the camshaft assembly 56 is reversed in order to lower the platten assembly 54, and then the carriage assembly 50 is activated to withdraw the pallet assembly 48 and the HDA 44 from within the housing 110. The operator can then remove the pallet assembly 48 from the carriage 196, utilize the ejectors 76 and 78 to disconnect the flex cables from the plugs 80 and 82, and then remove the HDA 44 from the pallet assembly.

From the foregoing it will be appreciated that the servo track writer station 40 of the present invention provides means for writing servo track and clock information onto an HDA 44 automatically. The station 40 automatically positions and accesses the pallet assembly 48, including the HDA 44, in accordance with computerized instructions. The particular arrangement of the platten assembly 54 and the top plate assembly 58 effectively isolates the HDA 44 from unwanted vibration during the application of the data to the hard disks 64. The HDA is processed in its normal orientation, and the HDA is not required to be inverted either before, during or after processing by the servo track writer station 40. Further, instead of using a separate read/write head for applying servo track information as is common practice in the prior art, the servo track writer station 40 of the present invention applies such servo data by utilizing an HDA read/write head 74 which forms a portion of the HDA actuator assembly 148. Thus, error which could be introduced by utilizing a separate head is eliminated. Moreover, through the provision of ejectors 76 and 78 as a part of the pallet assembly 48, damage to HDA flex connectors is minimized or altogether eliminated. The servo track writer station 40 automatically applies the desired information and minimizes operator interface, especially at those points where precision is essential.

Although a particular embodiment of the invention has been described in detail for purposes of illustration, various modifications may be made without departing from the spirit and scope of the invention. Accordingly, the invention is not to be limited, except as by the appended claims.

We claim:

1. A servo track writer station for automatically applying servo track data to a selected surface of a hard disk within a hard disk assembly (HDA), the servo track writer station comprising:

a housing;

means for automatically positioning the HDA within the housing, including carriage assembly means for loading the HDA exteriorly of the housing and then automatically carrying the HDA in its normal operational orientation into the housing, means for connecting electrical components of the HDA with the servo track writer station when the HDA is fully inserted within the housing by the carriage assembly means, elevator means for lifting the HDA off of the carriage assembly means without electrically disconnecting the HDA from the servo track writer station, and top plate assembly means for positioning the HDA in its elevated position and for isolating the HDA from vibration;

means for rotating the hard disk within the HDA when positioned within the housing; and means for applying servo track data to the selected surface when the HDA is positioned within the housing, utilizing a read/write head means provided by the HDA adjacent to the selected surface.

2. A servo track writer station as set forth in claim 1, wherein the carriage assembly means includes a carriage onto which the HDA is physically placed, a track which guides the carriage into the housing, and a lead screw assembly means for driving the carriage into and out of the housing.

3. A servo track writer station as set forth in claim 2, including sensor means for detecting when the carriage is fully inserted within the housing and, oppositely, when the carriage is fully retracted from the housing.

4. A servo track writer station as set forth in claim 2, including sensor means for sensing when the HDA has been loaded onto the carriage, the sensor means enabling the lead screw assembly to begin moving the carriage into the housing.

5. A servo track writer station as set forth in claim 1, wherein the means for rotating the hard disk within the HDA when positioned within the housing includes a pallet assembly onto which the HDA is placed and secured thereon prior to placement onto the carriage assembly means, the pallet assembly providing means for connecting electrical components of the HDA with the servo track writer station when fully inserted into the housing.

6. A servo track writer station as set forth in claim 5, wherein the pallet assembly includes:
a pallet for supporting the HDA thereon;
alignment means for positioning the HDA on the pallet;
means for securing the HDA on the pallet;
an STW (Servo Track Writer) connector for connecting the pallet assembly with power and servo data from the servo track writer station; and
means for connecting electrical components of the HDA with the servo track writer station through the STW connector.

7. A servo track writer station as set forth in claim 1, wherein the elevator means includes a platten assembly which underlies the HDA when fully inserted into the housing by the carriage assembly means, and a camshaft assembly capable of lifting the platten assembly together with the HDA off of the carriage assembly means.

8. A servo track writer station as set forth in claim 7, wherein the platten assembly includes a plurality of spring loaded plungers which extend upwardly from a platten to support the HDA at predetermined points, and means for connecting electrical components of the HDA with the servo track writer station.

9. A servo track writer station as set forth in claim 7, including means for sensing when the platten assembly is in a lowered configuration, in order to permit activation of the carriage assembly means.

10. A servo track writer station as set forth in claim 7, wherein the camshaft assembly includes at least one cam eccentrically positioned upon a camshaft beneath the platten assembly, motor means for turning the at least one cam, and stop means for limiting rotation of the at least one cam.

11. A servo track writer station as set forth in claim 10, wherein the camshaft assembly includes means for preventing rotation of the camshaft unless the carriage assembly means is fully inserted within the housing.

12. A servo track writer station as set forth in claim 10, wherein the camshaft assembly includes electronic means for sensing the position of the at least one cam relative to the platten assembly.

13. A servo track writer station as set forth in claim 10, wherein the camshaft assembly includes handle means for permitting manual turning of the camshaft in order to raise or lower the platten assembly.

14. A servo track writer station as set forth in claim 1, wherein the top plate assembly means includes means for engaging a top portion of the HDA, which means, together with the elevator means, isolates the HDA from vibration.

15. A servo track writer station as set forth in claim 14, wherein the top plate assembly means includes a plurality of spring loaded plungers and a spindle shaft assembly which are supported by a top plate for the housing and which extend downwardly to engage portions of the HDA.

16. A servo track writer station as set forth in claim 14, wherein the top plate assembly means includes arm assembly means for engaging an HDA actuator assembly in a manner permitting the arm assembly means to control movement of the HDA actuator assembly, the arm assembly means providing a mechanical interface between the servo track writer station and the HDA.

17. A servo track writer station as set forth in claim 16, wherein the arm assembly means includes a crash stop pin drive assembly which engages a crash stop pin provided in the HDA actuator assembly, to move the HDA actuator assembly.

18. A servo track writer station as set forth in claim 1, wherein the means for applying servo track data includes a positioner means for controlling movement of the HDA read/write head means adjacent to the selected surface, and servo data supply means for providing servo data generated by the servo track writer station directly to the HDA read/write head means.

19. A servo track writer station as set forth in claim 18, wherein the servo data supply means includes means for generating servo data within the writer station, and means for connecting electrical components of the HDA with the servo track writer station.

20. A servo track writer station as set forth in claim 18, wherein the positioner means includes motor means for driving a stage plate, an arm assembly which engages an actuator assembly of the HDA to control movement thereof, and means for connecting the arm assembly to the stage plate.

21. A servo track writer station as set forth in claim 20, wherein the connecting means includes a microslide placed upon but not rigidly connected to the stage plate, an adaptor plate fixed to the microslide, a stop bracket fixed to the stage plate in abutting relation to one end of the adaptor plate, and spring means for biasing the adaptor plate into contact with the stop bracket.

22. A servo track writer station as set forth in claim 21, including means for monitoring travel of the stage plate.

23. A servo track writer station as set forth in claim 21, including override sensing means for determining if the stage plate has moved beyond a desired travel limit, which override sensing means provides input to the servo track writer station which allows the positioner means to be shut down.

24. A servo track writer station as set forth in claim 17, wherein the means for applying servo track data includes a stage plate, motor means for driving the stage plate, and means for connecting the arm assembly means to the stage plate.

25. A servo track writer station as set forth in claim 24, wherein the connecting means provides safety means for preventing damage to the positioner means in the event of over-travel of the stage plate, the connecting means including a microslide placed upon but not connected to the stage plate, an adaptor plate fixed to the microslide, a stop bracket fixed to the stage plate in an abutting relation to the adaptor plate, and spring means for biasing the adaptor plate and the stop bracket into their abutting relation, wherein one end of the arm assembly means is positioned by the adaptor plate and moves in response to movement of the stage plate.

26. A servo track writer station as set forth in claim 1, including means for applying clock data to a second hard disk within the HDA.

27. A servo track writer station as set forth in claim 26, wherein the means for applying clock data includes a lead screw motor which positions a sliding arm through the housing, and a clock head positioned at the lower end of the sliding arm, which clock head is selectively positionable over one or more hard disks to apply clock data thereon.

28. A servo track writer station as set forth in claim 27, wherein the means for applying clock data includes means for sensing the position of the sliding arm, and means for sensing contact between the clock head and a disk surface.

29. A servo track writer station as set forth in claim 27, wherein the means for applying clock data includes means for manually overriding positioning of the sliding arm by the lead screw motor, and for permitting manual positioning of the clock head.

30. A servo track writer station as set forth in claim 27, wherein the means for applying clock data includes selectively adjustable manual stop means for limiting vertical movement of the sliding arm.

31. A servo track writer station as set forth in claim 1, wherein the selected surface comprises the lower surface of a lowermost disk in a disk stack within the HDA.

32. A servo track writer station for automatically applying servo track data to a selected servo service of a hard disk within a hard disk assembly (HDA), the servo track writer station comprising:
a housing;
carriage assembly means for loading the HDA exteriorly of the housing, the carriage assembly means capable of carrying the HDA in its normal operational orientation into the housing;
means for connecting electrical components of the HDA with the servo track writer station when the HDA is fully inserted within the housing by the carriage assembly means;
means for lifting the HDA off of the carriage assembly means without electrically disconnecting the HDA from the servo track writer station;
means for applying clock data to a hard disk within the HDA;
means for precisely positioning an HDA actuator assembly and its attached HDA actuator arms; and
means for applying servo track data to the selected servo surface utilizing an HDA read/write head provided by the HDA actuator assembly, wherein the precise position of the HDA read/write head is controlled by the servo track writer station HDA actuator assembly positioning means during application of servo track data to the selected servo surface.

33. A servo track writer station as set forth in claim 32, wherein the carriage assembly means includes a carriage onto which the HDA is physically placed, a track for guiding the carriage into the housing, and a lead screw assembly for driving the carriage along the track.

34. A servo track writer station as set forth in claim 33, including means for sensing when the HDA is loaded upon the carriage, the carriage load sensing means allowing activation of the lead screw assembly and movement of the carriage along the track, and means for sensing the position of the carriage when fully inserted within the housing or when fully retracted from the housing.

35. A servo track writer station as set forth in claim 32, wherein the means for connecting electrical components of the HDA with the servo track writer station includes a pallet assembly comprising:
a pallet for supporting the HDA thereon;
alignment means for positioning the HDA on the pallet;
means for securing the HDA on the pallet;
an STW connector for connecting the pallet assembly with power and servo data from the servo track writer station; and
means for connecting electrical components of the HDA with the servo track writer station through the STW connector.

36. A servo track writer station as set forth in claim 35, including an STW connector plug situated within the housing, which automatically engages the STW connector when the pallet assembly is fully inserted into the housing.

37. A servo track writer station as set forth in claim 35, wherein the pallet assembly includes a read/write flex connector plug for receiving a read/write flex connector from the HDA.

38. A servo track writer station as set forth in claim 37, including a manually actuable ejector situated generally adjacent to the read/write flex plug of the pallet assembly, the ejector being configured to assist connection of the read/write flex connector to the plug, as well as separation of the read/write flex connector from the plug.

39. A servo track writer station as set forth in claim 35, wherein the pallet assembly includes a spindle motor plug for receiving a spindle motor flex connector from the HDA.

40. A servo track writer station as set forth in claim 39, including an ejector situated adjacent to the spindle motor plug, which is manually actuable to disconnect the spindle motor flex connector from the spindle motor plug.

41. A servo track writer station as set forth in claim 32, wherein the means for lifting the HDA off of the carriage assembly means includes a platten assembly situated directly beneath the HDA when fully inserted within the housing, and a camshaft assembly capable of placing the platten assembly in engagement with a lower surface of the HDA and lifting both the platten assembly and the HDA to a desired location within the housing.

42. A servo track writer station as set forth in claim 41, wherein the platten assembly includes a plurality of spring loaded plungers which extend upwardly to support the HDA at predetermined points, and wherein the camshaft assembly includes a plurality of cams situated below the platten assembly, the cams being eccentrically positioned upon a camshaft and rotatable by means of a camshaft motor through a limited angular range.

43. A servo track writer station as set forth in claim 42, wherein the camshaft assembly includes means for preventing rotation of the camshaft unless the carriage assembly means is fully inserted within the housing, sensing means for determining rotation of the camshaft, and means for manually turning the camshaft.

44. A servo track writer station as set forth in claim 42, including a top plate assembly which, together with the platten assembly in its elevated configuration, provides means for isolating the HDA from detrimental vibration, the top plate assembly including downwardly extending spring-loaded plungers, a spindle shaft assembly, and an arm assembly, which all extend downwardly from a cover for the housing, the plungers, the spindle shaft assembly and the arm assembly collectively contacting and supporting the HDA at points generally opposite the spring-loaded plungers of the platten assembly.

45. A servo track writer station as set forth in claim 32, wherein the means for applying clock data includes a lead screw motor which positions a sliding arm, wherein the sliding arm extends through a cover for the housing and, in turn, supports a clock head adjacent a lower end thereof.

46. A servo track writer station as set forth in claim 45, wherein the means for applying clock data includes means for sensing the position of the sliding arm within a limited range of vertical travel, means for sensing contact between the clock head and a disk surface, and selectively adjustable manual stop means for limiting vertical movement of the clock head within a selected vertical range relative to a stack of disks within the HDA.

47. A servo track writer station as set forth in claim 32, wherein the means for positioning the HDA actuator assembly includes an arm assembly supported by the housing which engages the HDA actuator assembly at one end in a manner controlling movement thereof, and positioner means for controlling movement of an opposite end of the arm assembly, wherein the positioner means controls, through the arm assembly, the positioning of the HDA read/write head adjacent to the selected servo surface, the positioner means including a stage plate driven by precision motor means, and means for connecting the arm assembly to the stage plate.

48. A servo track writer station as set forth in claim 47, wherein the connecting means includes a microslide slidably positioned upon the stage plate, an adaptor plate fixed to an upper surface of the microslide, the adaptor plate including a recess wherein the opposite end of the arm assembly is positioned, a stop bracket fixed to the stage plate in abutting relation with the adaptor plate, and means for biasing the adaptor plate into the abutting relation with the stop bracket.

49. A servo track writer station as set forth in claim 32, wherein the selected servo surface comprises the lower surface of a lowermost disk in a disk stack within the HDA.

50. A pallet assembly for use in a servo track writer station, comprising:
  a pallet for supporting a hard drive assembly (HDA) thereon;
  alignment means for positioning the HDA on the pallet;
  means for securing the HDA on the pallet;
  an STW connector for connecting the pallet assembly with power and servo data from the servo track writer station; and
  means for connecting electrical components of the HDA with the servo track writer station through the STW connector.

51. A pallet assembly as set forth in claim 50, wherein the alignment means comprises at least two alignment pins which extend upwardly from the the pallet.

52. A pallet assembly as set forth in claim 51, wherein the means for securing the HDA on the pallet includes strap means attached generally adjacent to each of the alignment pins and which are capable of being stretched over an adjacent portion of the HDA and fixed to an upper portion of the associated alignment pin.

53. A pallet assembly as set forth in claim 50, including a plurality engagement pads within the pallet provided generally at those portions of the pallet which will support an HDA actuator assembly, an HDA spindle motor, and at least one HDA housing leg.

54. A pallet assembly as set forth in claim 53, including at least one precision insert provided in the pallet and moveable with respect thereto, positioned generally at an additional point of contact between the HDA and the pallet.

55. A pallet assembly as set forth in claim 50, including a circuit board fixed to the pallet and connected to the STW connector.

56. A pallet assembly as set forth in claim 55, wherein the means for connecting electrical components of the HDA with the servo track writer station through the STW connector includes a read/write flex plug supported on the pallet and electrically connected with the circuit board, for receiving a read/write flex connector from the HDA.

57. A pallet assembly as set forth in claim 56, including an ejector situated adjacent to the read/write flex plug, the ejector situated including means for assisting in the connecting the read/write flex connector and the read/write plug, as well as means for assisting in disconnecting the read/write flex connector from the read/write plug.

58. A pallet assembly as set forth in claim 55, wherein the means for connecting electrical components of the HDA with the servo track writer station through the STW connector includes a spindle flex plug supported on the pallet and connected to the circuit board, the spindle flex plug being configured for connection to a spindle flex connector from the HDA.

59. A pallet assembly as set forth in claim 58, including an ejector situated generally adjacent to the spindle flex plug, the ejector including manually actuable means for assisting in disconnecting the spindle flex connector from the spindle flex plug.

60. A method for applying servo track data to a selected servo surface of a hard disk within a hard drive assembly (HDA), the steps comprising:
  suspending the HDA to minimize vibration thereto, the step of suspending the HDA including the steps of drawing the HDA into a suspension housing, elevating the HDA to a selected suspension location, and supporting the upper and lower surfaces of the HDA in a manner minimizing vibration thereto;

activating the HDA to bring the hard disk to operational speed;

supplying servo track data to a read/write head within the HDA and which is adjacent to the selected servo surface; and writing the servo track data onto the selected servo surface utilizing the read/write head.

61. A method as set forth in claim 60, wherein the step of drawing the HDA into the suspension housing occurs automatically in a hands-free manner.

62. A method as set forth in claim 60, wherein the step of elevating the HDA includes sensing the position of the HDA and providing non-rigid supports for the undersurface of the HDA.

63. A method as set forth in claim 60, wherein the step of supporting the upper and lower surfaces of the HDA includes contacting the upper and lower surfaces with spring loaded plungers to hold the HDA in its suspended position.

64. A method as set forth in claim 60, wherein the step of activating the HDA to bring the hard disk to operational speed includes automatically attaching the HDA to electrical control means prior to the step of suspending the HDA.

65. A method as set forth in claim 60, wherein the step of writing the servo track data onto the selected servo surface utilizing the read/write head includes automatically mechanically engaging the read/write head with an actuator arm, and moving the actuator arm to control the precise positioning of the read/write head which is adjacent to the selected servo surface.

66. A method as set forth in claim 65, wherein the read/write head is first caused to erase any prior applied data to the selected servo surface before writing the servo track data onto the selected servo surface.

67. A method as set forth in claim 60, wherein the selected servo surface comprises the lower surface of the lowermost disk in a disk stack within the HDA.

68. A method as set forth in claim 60, including the step of applying clock information to a second data surface within the hard drive assembly, by means of a clock head assembly.

69. A method as set forth in claim 68, including the steps of sensing the location of the clock head assembly relative to the second surface within the HDA, sensing contact between a clock head and the second surface, and limiting movement of the clock head assembly relative to the second surface.

70. A method for applying servo track data to a selected servo surface of a disk stack within a hard drive assembly (HDA), the steps comprising:

attaching the HDA to a pallet assembly, wherein electrical connectors of the HDA are connected through the pallet assembly to an STW connector;

loading the pallet assembly with the HDA onto a carriage assembly;

automatically drawing the carriage assembly into a housing and connecting electrical components of the HDA with power and servo data means through the STW connector;

elevating the pallet assembly and the HDA within the housing after being fully inserted thereinto;

suspending the HDA within the housing to minimize vibration to the HDA;

activating the HDA to bring the hard disk stack to operational speed;

mechanically moving an actuator assembly within the HDA in order to erase pre-applied data to the selected servo surface;

supplying servo track data to a read/write head within the HDA, which head is adjacent to the selected servo surface;

writing the servo track data onto the selected servo surface utilizing the read/write head;

lowering the HDA within the housing; and withdrawing the HDA and pallet assembly from the housing;

wherein all of the steps between the loading and unloading of the pallet from the carriage assembly are done automatically in a hands-free fashion while maintaining the HDA in a normal operating orientation.

71. A method as set forth in claim 70, including the step of applying clock information to an upper disk surface within the disk stack while the HDA is suspended within the housing.

72. A method as set forth in claim 70, wherein the selected servo surface comprises the lower surface of a lowermost disk in the disk stack within the HDA.

73. A servo track writer station for automatically applying servo track data to a selected surface of a hard disk within a hard disk assembly (HDA), the servo track writer station comprising:

a housing;

means for automatically positioning the HDA within the housing;

means for rotating the hard disk within the HDA when positioned within the housing;

means for applying servo track data to the selected surface when the HDA is positioned within the housing, utilizing a read/write head means provided by the HDA adjacent to the selected surface; and means for applying clock data to a second hard disk within the HDA, including a lead screw motor which positions a sliding arm through the housing, and a clock head positioned at a lower end of the sliding arm, which clock head is selectively positionable over one or more hard disks to apply clock data thereon.

74. A servo track writer station as set forth in claim 73, wherein the means for applying clock data includes means for sensing the position of the sliding arm, and means for sensing contact between the clock head and a disk surface.

75. A servo track writer station as set forth in claim 73, wherein the means for applying clock data includes means for manually overriding positioning of the sliding arm by the lead screw motor, and for permitting manual positioning of the clock head.

76. A servo track writer station as set forth in claim 73, wherein the means for applying clock data includes selectively adjustable manual stop means for limiting vertical movement of the sliding arm.

77. A method for applying servo track data to a selected servo surface of a hard disk within a hard drive assembly (HDA), the steps comprising:

suspending the HDA to minimize vibration thereto;

activating the HDA to bring the hard disk to operational speed;

supplying servo track data to a read/write head within the HDA and which is adjacent to the selected servo surface;
writing the servo track data onto the selected servo surface utilizing the read/write head; and
applying clock information to a second data surface within the hard drive assembly, by means of a clock head assembly, the step of applying clock information including the steps of sensing the location of the clock head assembly relative to the second surface within the HDA, sensing contact between a clock head and the second surface, and limiting movement of the clock head assembly relative to the second surface.

* * * * *

UNITED STATES PATENT AND TRADEMARK OFFICE
CERTIFICATE OF CORRECTION

PATENT NO. : 4,980,783

DATED : December 25, 1990

INVENTOR(S) : Michael B. Moir and Richard G. Krum

It is certified that error appears in the above-identified patent and that said Letters Patent is hereby corrected as shown below:

In column 26, line 45, delete the word "situated".

In column 26, line 46, delete the word "the" between the words "in" and "connecting".

Signed and Sealed this

Thirtieth Day of June, 1992

*Attest:*

DOUGLAS B. COMER

*Attesting Officer*  *Acting Commissioner of Patents and Trademarks*